US012615679B2

(12) United States Patent
Lu et al.

(10) Patent No.: US 12,615,679 B2
(45) Date of Patent: Apr. 28, 2026

(54) MULTI LINK RECONFIGURATION METHOD AND APPARATUS, AND COMMUNICATION DEVICE

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/272,887

(22) Filed: Jul. 17, 2025

(65) Prior Publication Data

US 2025/0351212 A1      Nov. 13, 2025

Related U.S. Application Data

(63) Continuation of application No. 18/987,799, filed on Dec. 19, 2024, which is a continuation of application No. PCT/CN2022/101326, filed on Jun. 24, 2022.

(51) Int. Cl.
*H04W 76/15*          (2018.01)
(52) U.S. Cl.
CPC .................................. *H04W 76/15* (2018.02)
(58) Field of Classification Search
CPC ...... H04W 76/15; H04W 76/38; H04W 84/12
See application file for complete search history.

(56) References Cited

U.S. PATENT DOCUMENTS

| | | | |
|---|---|---|---|
| 2022/0346166 A1 | 10/2022 | Guo et al. | |
| 2023/0209536 A1* | 6/2023 | Guo | H04W 72/1263 |
| | | | 370/329 |
| 2023/0247703 A1* | 8/2023 | Huang | H04W 76/15 |
| | | | 370/328 |

(Continued)

FOREIGN PATENT DOCUMENTS

| | | |
|---|---|---|
| CN | 114079949 A | 2/2022 |
| WO | 2021139213 A1 | 7/2021 |
| WO | 2021183045 A1 | 9/2021 |

OTHER PUBLICATIONS

International Search Report in the international application No. PCT/CN2022/101326, mailed on Mar. 17, 2023. 5 pages with English translation.

(Continued)

*Primary Examiner* — Farid Seyedvosoghi
(74) *Attorney, Agent, or Firm* — BAYES PLLC

(57) ABSTRACT

A multi-link reconfiguration method includes: a first multi-link device sends a first multi-link element to a second multi-link device, and/or receives a second multi-link element sent by the second multi-link device. The first multi-link element and/or the second multi-link element are/is used for determining at least one of the following: a type of multi-link reconfiguration operation, where one type of multi-link reconfiguration is for indicating link addition or another type of multi-link reconfiguration is for indicating link deletion; link information of a first part of links; common information of multiple links; or link information of a link related with the first part of links in a second part of links.

18 Claims, 6 Drawing Sheets

A first MLD sends a first multi-link element to a second MLD, and/or receives a second multi-link element sent by the second MLD; the first multi-link element and/or the second multi-link element is used for determining at least one of: a type of multi-link reconfiguration for indicating link addition or link deletion; link information of a first part of links; link common information; or link information of a link associated with the first part of links in the second part of links, where the first part of links is a link requested to be added or a link requested to be deleted by the first MLD, and the second part of links is at least one link established between the first MLD and the second MLD when or before performing the multi-link reconfiguration

401

(56)        References Cited

U.S. PATENT DOCUMENTS

2024/0064833 A1*   2/2024  Jang ........................ H04L 69/14

OTHER PUBLICATIONS

Written Opinion of the International Search Authority in the international application No. PCT/CN2022/101326, mailed on Mar. 17, 2023. 8 pages with English translation.

"IEEE P802.11be™/D2.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)," Prepared by the 802.11 Working Group of the LAN/MAN Standards Committee of the IEEE Computer Society, IEEE P802.11be/D2.0, May 2022. Section 35.3.6, Section 9.4.2.312.4.

"IEEE P802.11 Wireless LANs, Comment resolution for ML Reconfiguration", IEEE 802.11-21/534r1, Apr. 30, 2021, pp. 1-15.

Supplementary European Search Report in the European application No. 22947444.0, mailed on Feb. 24, 2026.

* cited by examiner

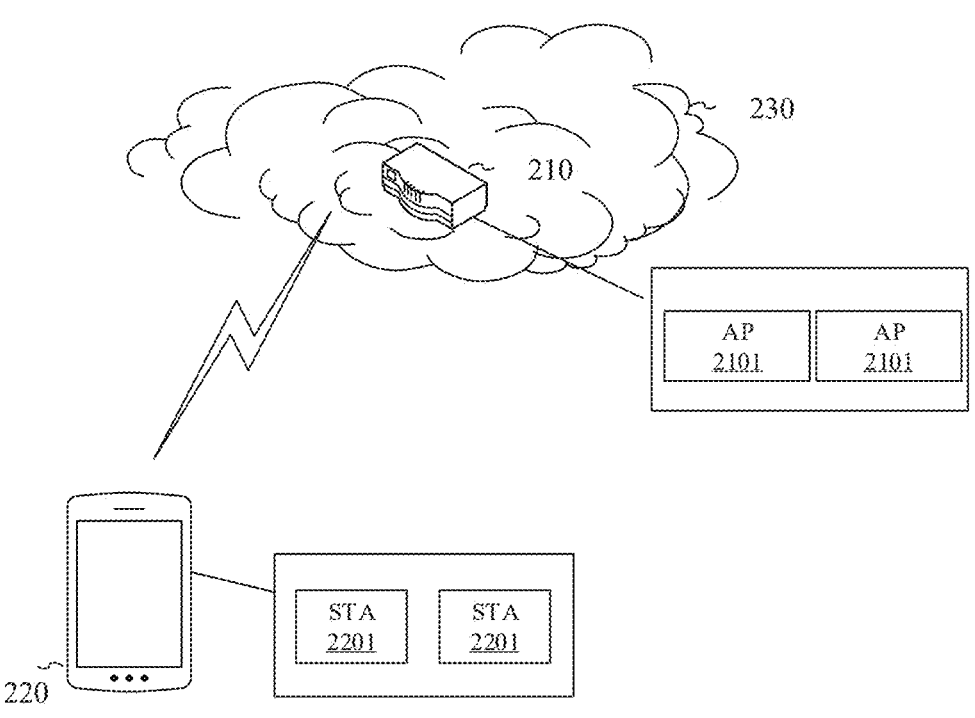
FIG. 2-2
| Link ID | Complete Profile | New Link ID | Delete Request | Reserved |
|---------|------------------|-------------|----------------|----------|
| 4 | 1 | 4 | 1 | 6 |
Bits
FIG. 3-1
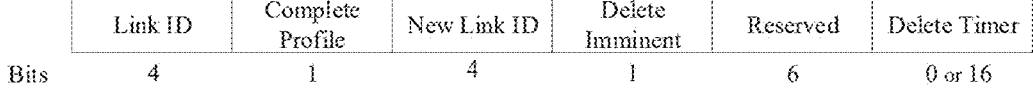
| Link ID | Complete Profile | New Link ID | Delete Imminent | Reserved | Delete Timer |
|---------|------------------|-------------|-----------------|----------|--------------|
| 4 | 1 | 4 | 1 | 6 | 0 or 16 |
Bits
FIG. 3-2

A first MLD sends a first multi-link element to a second MLD, and/or receives a
second multi-link element sent by the second MLD; the first multi-link element and/or
the second multi-link element is used for determining at least one of: a type of multi-
link reconfiguration for indicating link addition or link deletion; link information of a
first part of links; link common information; or link information of a link associated
with the first part of links in the second part of links, where the first part of links is a
link requested to be added or a link requested to be deleted by the first MLD, and the
second part of links is at least one link established between the first MLD and the
second MLD when or before performing the multi-link reconfiguration

| Element ID | Length | Element ID Extension | Multi-Link Control | Common Info | Link Info |
|---|---|---|---|---|---|
| Octets          1 | 1 | 1 | 2 | Variable | Variable |

FIG. 5

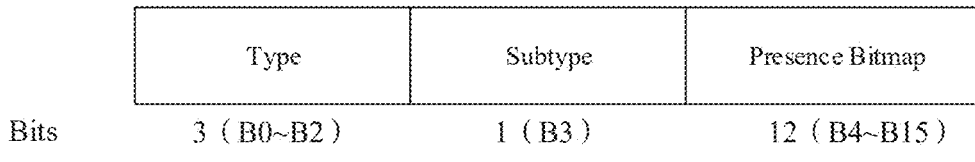

| Type | Subtype | Presence Bitmap |
|---|---|---|
| Bits          3 ( B0~B2 ) | 1 ( B3 ) | 12 ( B4~B15 ) |

FIG. 6

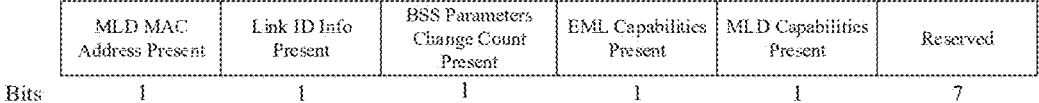

| MLD MAC Address Present | Link ID Info Present | BSS Parameters Change Count Present | EML Capabilities Present | MLD Capabilities Present | Reserved |
|---|---|---|---|---|---|
| Bits          1 | 1 | 1 | 1 | 1 | 7 |

FIG. 7

| Common Info Length | MLD MAC Address | Link ID Info | BSS Parameters Change Count | EML Capabilities | MLD Capabilities |
|---|---|---|---|---|---|
| Octets          1 | 0 or 6 | 0 or 1 | 0 or 1 | 0 or 3 | 0 or 2 |

FIG. 8

| Subelement ID | Length | STA Control | STA Info | STA Profile |
|---|---|---|---|---|
| Octets          1 | 1 | 2 | Variable | Variable |

FIG. 9

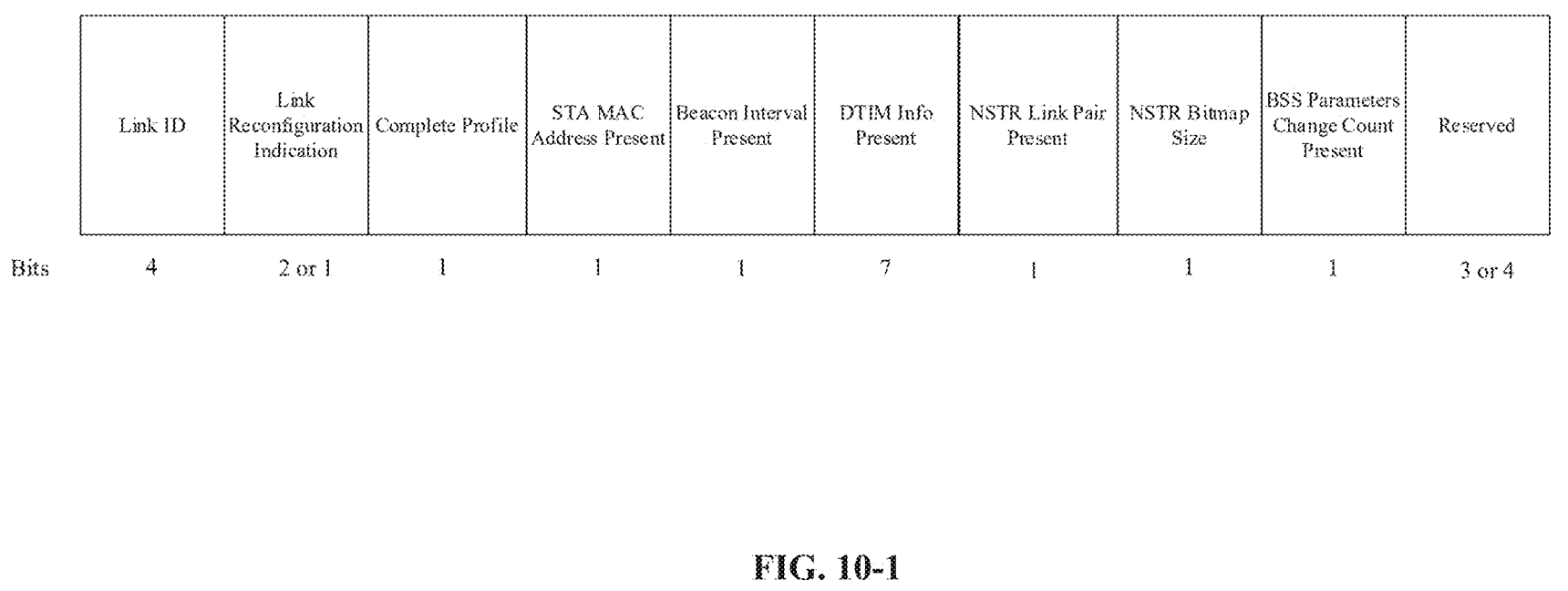

| Link ID | Link Reconfiguration Indication | Complete Profile | STA MAC Address Present | Beacon Interval Present | DTIM Info Present | NSTR Link Pair Present | NSTR Bitmap Size | BSS Parameters Change Count Present | Reserved |
|---|---|---|---|---|---|---|---|---|---|
| 4 | 2 or 1 | 1 | 1 | 1 | 7 | 1 | 1 | 1 | 3 or 4 |

Bits

FIG. 10-1

| Link ID | Link Reconfiguration Indication | Complete Profile | MAC Address Present | Delete Timer Present | Reserved |
|---------|--------------------------------|------------------|--------------------|--------------------|----------|
| 4 | 2 or 1 | 1 | 1 | 1 | 7 or 8 |
Bits
FIG. 10-2
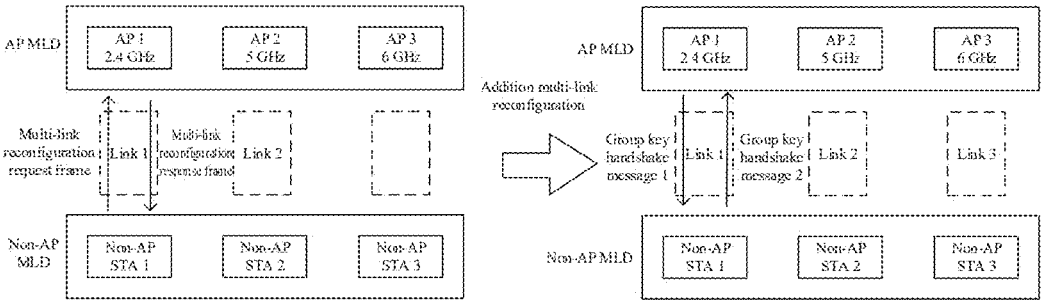
FIG. 11
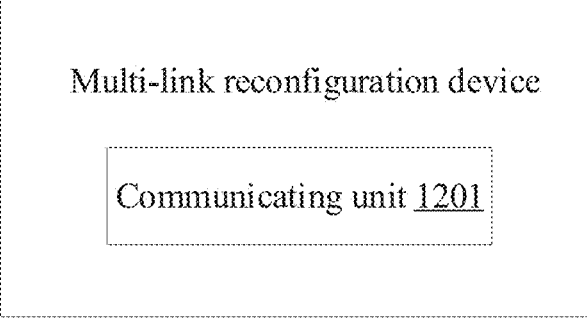
FIG. 12

MULTI LINK RECONFIGURATION METHOD AND APPARATUS, AND COMMUNICATION DEVICE

CROSS-REFERENCE TO RELATED APPLICATIONS

This application is a continuation of U.S. patent application Ser. No. 18/987,799, filed on Dec. 19, 2024, which is a continuation of International Application No. PCT/CN2022/101326, filed on Jun. 24, 2022. The contents of the above applications are hereby incorporated by reference in their entirety.

TECHNICAL FIELD

Embodiments of the present disclosure relate to the technical field of mobile communications, and in particular to, a multi-link reconfiguration method and a multi-link reconfiguration device, and a communication device.

BACKGROUND

One or more links may be established between a non-Access Point Multi-Link Device (non-AP MLD) and an Access Point Multi-Link Device (AP MLD). After the one or more links are established between the non-AP MLD and the AP MLD, one or more affiliated Access Points (Aps) may be added for the AP MLD or may also be deleted for the AP MLD. Similarly, one or more affiliated stations (STAs) may be added for the non-AP MLD or may also be deleted for the non-AP MLD. In this case, it is necessary to perform multi-link reconfiguration between the non-AP MLD and the AP MLD, and how to perform the multi-link reconfiguration needs to be improved.

SUMMARY

Embodiments of the present disclosure provide a multi-link reconfiguration method and a multi-link reconfiguration device, a communication device, a chip, a computer-readable storage medium, a computer program product, and a computer program.

The multi-link reconfiguration method provided by the embodiments of the present disclosure includes following operation.

A first MLD sends a first multi-link element to a second MLD, and/or receives a second multi-link element sent by the second MLD. The first multi-link element and/or the second multi-link element is used for determining at least one of followings:

a type of multi-link reconfiguration operation, where one type of multi-link reconfiguration is for indicating link addition or another type of multi-link reconfiguration is for indicating link deletion;

link information of a first part of links;

common information of multiple links; or link information of a link related with the first part of links in the second part of links.

The first part of links is a link requested to be added or a link requested to be deleted by the first MLD, and the second part of links is at least one link established between the first MLD and the second MLD when or before performing the multi-link reconfiguration.

A multi-link reconfiguration device provided by the embodiments of the present disclosure is applied to a first MLD, and the device includes a communicating unit.

The communicating unit is configured to send a first multi-link element to a second MLD, and/or receives a second multi-link element sent by the second MLD. The first multi-link element and/or the second multi-link element is used for determining at least one of:

a type of multi-link reconfiguration operation, where one type of multi-link reconfiguration is for indicating link addition or another type of multi-link reconfiguration is for indicating link deletion;

link information of a first part of links;

common information of multiple links; or link information of a link related with the first part of links in the second part of links.

The first part of links is a link requested to be added or a link requested to be deleted by the first MLD, and the second part of links is at least one link established between the first MLD and the second MLD when or before performing the multi-link reconfiguration.

A communication device provided by the embodiments of the present disclosure includes a processor and a memory. The memory is configured to store a computer program and the processor is configured to invoke and execute the computer program stored in the memory to perform the multi-link reconfiguration method described above.

A chip provided by the embodiments of the present disclosure is used for implementing the multi-link reconfiguration method described above. Specifically, the chip includes a processor configured to invoke and execute a computer program from a memory, to enable a device installed with the chip to perform the multi-link reconfiguration method described above.

A computer-readable storage medium provided by the embodiments of the present disclosure is configured to store a computer program that causes a computer to perform the multi-link reconfiguration method described above.

A computer program product provided by the embodiments of the present disclosure includes computer program instructions that cause a computer to perform the multi-link reconfiguration method described above.

A computer program provided by the embodiment of the present disclosure causes the computer to perform the multi-link reconfiguration method when the computer program is run on the computer.

According to the above technical schemes, a new multi-link element (i.e., the first multi-link element and/or the second multi-link element) is introduced, and by interacting the new multi-link element between the first MLD and the second MLD, on the basis that the second part of links has been established between the first MLD and the second MLD, addition of a new link or deletion of an established link can be implemented, thereby improving the multi-link reconfiguration mechanism.

BRIEF DESCRIPTION OF THE DRAWINGS

The drawings described herein are adopted to provide a further understanding to the present disclosure and form a part of the present disclosure. Schematic embodiments of the present disclosure and descriptions thereof are adopted to explain the present disclosure and not intended to form improper limits to the present disclosure. In the drawings:

FIG. 2-1 is a schematic diagram of a scenario to which an embodiment of the present disclosure is applied.

FIG. 2-2 is a schematic diagram of another scenario to which an embodiment of the present disclosure is applied.

FIG. 3-1 is a schematic diagram of a format of a per-STA control field.

FIG. 3-2 is a schematic diagram of another format of a per-STA control field.

FIG. 4 is a schematic flowchart of a multi-link reconfiguration method according to an embodiment of the present disclosure.

FIG. 5 is a schematic diagram of a format of a multi-link element according to an embodiment of the present disclosure.

FIG. 6 is a schematic diagram of a format of a multi-link control field according to an embodiment of the present disclosure.

FIG. 7 is a schematic diagram of a format of a presence bitmap subfield according to an embodiment of the present disclosure.

FIG. 8 is a schematic diagram of a format of a common information field according to an embodiment of the present disclosure.

FIG. 9 is a schematic diagram of a format of a per-STA profile subelement according to an embodiment of the present disclosure.

FIG. 10-1 is a schematic diagram of a format of a STA control subfield according to an embodiment of the present disclosure.

FIG. 10-2 is a schematic diagram of another format of a STA control subfield according to an embodiment of the present disclosure.

FIG. 11 is a schematic diagram of an addition multi-link reconfiguration according to an embodiment of the present disclosure.

FIG. 12 is a schematic diagram of a structural composition of a multi-link reconfiguration device according to an embodiment of the present disclosure.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical schemes of the embodiments of the present disclosure may be applied to various communication systems, such as Wireless Local Area Networks (WLAN), Wireless Fidelity (WiFi), other communication systems, and the like. The frequency bands that the WLAN can support may include, but are not limited to, a low frequency band (2.4 GHz, 5 GHz, 6 GHZ), and a high frequency band (60 GHz).

Figure 1:
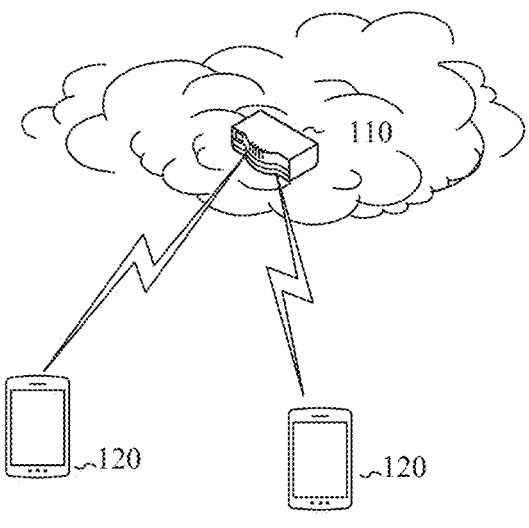
FIG. 1 is an architecture diagram of a communication system to which an embodiment of the present disclosure is applied.

FIG. 1 is an example of architecture of a communication system to which an embodiment of the present disclosure is applied.

As illustrated in FIG. 1, the communication system 100 may include an AP 110, and a STA 120 accessing a network through the AP 110. In some scenarios, the AP 110 may be referred to as an AP STA. That is to say, in a sense, the AP 110 is also a STA. In some scenarios, the STA 120 may be referred to as a non-AP STA. In some scenarios, the STA 120 may include an AP STA and a non-AP STA. The communications in the communication system 100 may include: a communication between the AP 110 and the STA 120, or a communication between the STA 120 and the STA 120, or a communication between the STA 120 and a peer STA. The peer STA may be a device communicating with a peer of the STA 120, for example, the peer STA may be an AP or a non-AP STA.

The AP 110 may be used as a bridge connecting a wired network and a wireless network, and has a main function of connecting various clients of a wireless network together, and then connecting the wireless network to the Ethernet. The AP 110 may be a terminal device (such as a mobile phone) or a network device (such as a router) with a WiFi chip.

It is to be noted that the role of the STA 120 in the communication system is not absolute. That is to say, the role of the STA 120 in the communication system may be switched between the AP and the STA. For example, in some scenarios, when a mobile phone is connected to a router, the mobile phone is the STA; and when the mobile phone is a hotspot for other mobile phones, the mobile phone acts as the AP.

In some embodiments, the AP 110 and the STA 120 may be devices applied in the Internet of Vehicles, Internet of Things (IoT) nodes, sensors or the like in the IoT, smart cameras, smart remote controllers, smart meters, water meters or the like in the smart home, and sensors or the like in the smart city.

In some embodiments, the AP 110 may be a device supporting the 802.11be standard. The AP may also be a device supporting various current and future 802.11 family WLAN standards, such as 802.11ax, 802.11ac, 802.11n, 802.11g, 802.11b, and 802.11a. In some embodiments, the STA 120 may support the 802.11be standard. The STA may also support various current and future 802.11 family WLAN standards, such as 802.11ax, 802.11ac, 802.11n, 802.11g, 802.11b, and 802.11a.

In some embodiments, the AP 110 and/or the STA 120 may be deployed on land, and include indoor or outdoor device, hand-held device, wearable device or vehicle-mounted device. The AP 110 and/or the STA 120 may also be deployed on the water (such as on the ships). The AP 110 and/or the STA 120 may also be deployed in the air (such as, in airplanes, in balloons and in satellites, etc.).

In some embodiments, the STA 120 may be a mobile phone supporting the WLAN/WiFi technology, a Pad, a computer with a wireless transceiver function, a Virtual Reality (VR) device, an Augmented Reality (AR) device, a wireless device in industrial control, a set-top box, a wireless device in self-driving, a vehicle-mounted communication device, a wireless device in remote medical, a wireless device in smart grid, a wireless device in transportation safety, a wireless device in smart city, or a wireless device in smart home, a wireless communication chip/Application Specific Integrated Circuit (ASIC)/System on Chip (SoC), etc.

Exemplarily, the STA 120 may also be a wearable device. The wearable device may also be referred to as a wearable smart device, which is a general term of wearable devices that are intelligently designed and developed by applying wearable technology to daily wear, such as, glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. The generalized wearable smart device has full functions and a large size, and the generalized wearable smart device may realize complete or partial functions without relying on smart phones, such as smart watches or smart glasses, and the generalized wearable smart device only focus on certain application functions and need to be used in conjunction with other devices (such as, smart phones), such as, various smart bracelets and smart jewelry for monitoring physical signs.

It is to be understood that FIG. 1 is merely an example of the present disclosure and should not be understood as a limitation of the present disclosure. For example, FIG. 1 illustrates only one AP and two STAs by way of example, and in some embodiments, the communication system 100 may include multiple APs and other numbers of STAs, which are not limited in the embodiments of the present disclosure.

Figures 1, 2:
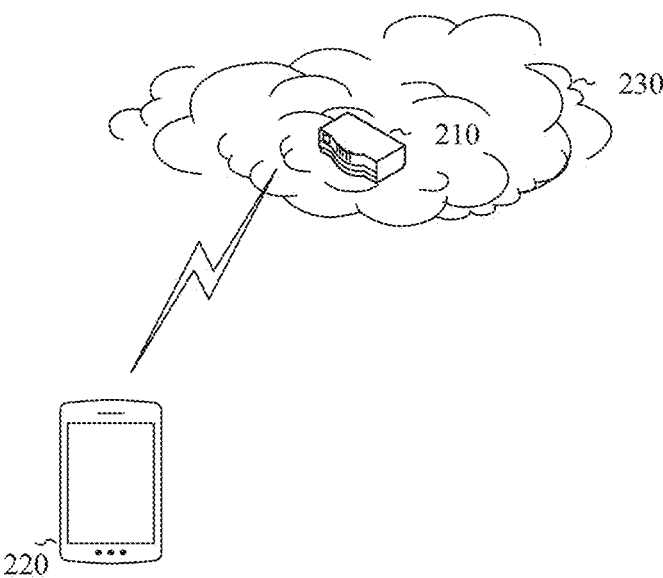

FIG. 2-1 is a schematic diagram of a scenario to which an embodiment of the present disclosure is applied.

As illustrated in FIG. 2-1, the communication system 200 may include: an AP MLD 210 and a non-AP MLD 220. The AP MLD 210 is an electronic device capable of forming a wireless local area network 230 based on a transmitted signal. For example, the AP MLD 210 may be a router, a mobile phone having a hotspot function. The non-AP MLD 220 is an electronic device accessing the wireless local area network 230 formed by the AP MLD 210. For example, the non-AP MLD 220 may be a mobile phone, a smart washing machine, an air conditioner, an electronic lock, and the like. The non-AP MLD 220 communicates with the AP MLD 210 through the wireless local area network 230. The AP MLD 210 may be a soft AP MLD, a Mobile AP MLD, or the like.

As illustrated in FIG. 2-2, in the communication system illustrated in FIG. 2-1, the AP MLD 210 is affiliated with at least two APs 2101, and the non-AP MLD 220 is affiliated with at least two STAs 2201. Each of APs is connected with a respective STA in the non-AP MLD 220 through a respective link. An AP related with the AP MLD may also be referred to as an affiliated AP of the AP MLD, an STA related with the non-AP MLD may also be referred to as an affiliated STA of the non-AP MLD.

In an embodiment of the present disclosure, the AP MLD 210 and the non-AP MLD 220 may be terminal devices. The terminal device may also be referred to as an access terminal, User Equipment (UE), a user unit, a user station, a mobile station, a remote station, a remote terminal, a mobile device, a user terminal, a terminal, a wireless communication device, a user agent or a user device, etc. The access terminal may be a cellular telephone, a cordless telephone, a Session Initiation Protocol (SIP) telephone, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in an 5th Generation (5G) network, or a terminal device in a future evolved Public Land Mobile Network (PLMN) network, etc.

The communication system 200 illustrated in FIG. 2-1 may further include a network device, and the network device may be an access network device that communicates with the terminal device. The access network device may provide communication coverage for a particular geographic area and may communicate with terminal devices located within the coverage.

FIG. 2-1 exemplarily illustrates one AP MLD and one non-AP MLD. In an embodiment, the wireless communication system 200 may include multiple non-AP MLDs accessing the wireless local area network 230, which is not limited in the embodiment of the present disclosure.

It is to be noted that FIG. 1, FIG. 2-1, and FIG. 2-2 only illustrate systems to which the present disclosure are applied in the form of examples, and of course, the method of the embodiments of the present disclosure may also be applied to other systems. Furthermore, the terms "system" and "network" are often used interchangeably herein. In the present disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the present disclosure generally indicates that the relationship between the related objects is "or". It is also to be understood that the term "indication" in embodiments of the present disclosure may be a direct indication, an indirect indication, or an indication of an associative relationship. For example, an indication of B by A may indicate that A directly indicates B, for example, B is obtained through A, or that A indirectly indicates B, for example, A indicates C and B is obtained through C, or that there is an association between A and B. It is also to be understood that the term "correspondence" in embodiments of the present disclosure may indicate a direct or indirect correspondence between the two elements, or may indicate an association between the two elements, or may indicate a relationship of indicating and being indicated, configuring and being configured, etc. It is also to be understood that the term "predefined" or "predefined rules" in embodiments of the present disclosure may be achieved by pre-storing corresponding codes, tables or other manners for indicating relevant information in devices (e.g., including a terminal device and a network device). The specific implementation is not limited in the present disclosure. For example, "predefined" may refer to those defined in a protocol. It is also to be understood that in this disclosure, "protocol" may refer to a standard protocol in the field of communication, which may include, for example, a LTE protocol, NR protocol and relevant protocol applied in the future communication system, which is not limited in the present disclosure.

To make the technical solutions of the embodiments of the present disclosure to be understood better, the relevant technology of the embodiments of the present disclosure is described below. The following relevant technology as optional solutions may be combined with the technical solutions of the embodiments in any way, and shall fall within the scope of protection of the present disclosure.

The multi-link reconfiguration mechanism defined in the related technologies includes a series of procedures of adding one or more affiliated APs into an AP MLD or deleting one or more affiliated APs from the AP MLD.

For addition of an affiliated AP, the AP MLD may add one or more affiliated APs at any time. Specifically, the AP MLD announces a new affiliated AP by changing a maximum number of simultaneous links field of an MLD capabilities field in a basic multi-link element of a beacon frame and/or a probe response frame and by containing a Target Beacon Transmission Time (TBTT) information field of the new affiliated AP in a reduced neighbor report element of the beacon frame and/or the probe response frame.

For deletion of an affiliated AP, the AP MLD may delete one or more of its affiliated APs. The AP MLD announces deletion of any affiliated AP by a reconfiguration multi-Link element transmitted in all beacon frames and/or probe response frames of all affiliated APs, until the affiliated AP has been deleted. For each affiliated AP attempted to be deleted by the AP MLD, the reconfiguration multi-link element includes a per-STA profile subelemen, and a per-STA control field of the per-STA profile subelement includes subfields set as follows: a link ID subfield for identifying the AP, a complete profile subfield being set to be 0, a delete timer present subfield being set to be 1, and a delete timer subfield being set to be the number of TBTTs before the affiliated AP is deleted. An initial value of the delete timer subfield should be longer than an MLD max idle period. The per-STA profile subelement should not contain a STA profile field. At the TBTT indicated by the delete timer subfield of the transmitted reconfiguration multi-link element, the associated non-AP MLD considers that a link corresponding to the deleted AP does not exist, and a Station Management Entity (SME) of an associated STA related with the deleted affiliated AP should delete any information used for maintaining the link corresponding to the deleted AP.

A reconfiguration variant multi-link element and a link reconfiguration request/response action frame based on the reconfiguration variant multi-link element are designed in the related technologies. The reconfiguration variant multi-link element has main features as follows.

1) The reconfiguration variant multi-link element does not contain a common info field.

2) The reconfiguration variant multi-link element contains a link information field, and the link information field contains 0 or more subelements. The extensible subelements are illustrated in Table 1.

TABLE 1

| Subelement ID | Name | Extensible |
|---|---|---|
| 0 | Per-STA Profile subelement | Yes |
| 1-220 | Reserved | |
| 221 | Vendor Specific | Vendor defined |
| 222-255 | Reserved | |

The per-STA profile subelement in Table 1 includes a per-STA control field. A format of the per-STA control field transmitted by the non-AP MLD is illustrated in FIG. 3-1, including a link ID subfield, a complete profile subfield, a new link ID subfield, and a delete request subfield. The new link ID subfield is used for indicating a link ID corresponding to a new AP requesting the connection. In particular, if the new link ID subfield is set to be 15, it indicates that a request for establishing a new link is not performed; and if the delete request subfield is set to be 1, it indicates that the link indicated by the link ID subfield is requested to be deleted. A format of the per-STA control field transmitted by the AP MLD is illustrated in FIG. 3-2, including a link ID subfield, a complete profile subfield, a new link ID subfield, a delete imminent subfield, and a delete timer subfield.

In the related technologies, the definition of the multi-link reconfiguration is limited to the procedure of adding one or more affiliated APs into the AP MLD or deleting one or more affiliated APs from the AP MLD. In an actual application scenario, after a multi-link setup is successfully performed between a non-AP MLD and an AP MLD to enable the non-AP MLD to be related with the AP MLD, if the AP MLD performs the multi-link reconfiguration, one affiliated AP is added, and information of the addition affiliated AP is provided in a beacon frame and/or a probe response frame. When the non-AP MLD attempts to establish a link with the addition affiliated AP, if the non-AP MLD firstly disassociates from the AP MLD and disassembles the established link, and then re-performs a multi-link setup including a link corresponding to the addition affiliated AP with the AP MLD, this will cause interruption of operations performed by the non-AP MLD on the previously established link, and the smooth setup for the addition link cannot be implemented. If the non-AP MLD directly performs the multi-link setup with the AP MLD without firstly disassociating from the AP MLD, this will cause repeated association between the non-AP MLD and the AP MLD, which cannot be supported by the multi-link setup rules and multi-link elements defined in the related technologies. In addition, the related technologies fail to solve the problem of how to coordinate multi-link common parameters and link specific parameters between the established link and the reconfiguration link, for example, how to coordinate MLD capabilities information affected by the setup of the addition link in the procedure of establishing the addition link, how to coordinate other link parameter information affected by the addition link, and so on.

Therefore, for the multi-link reconfiguration, a link addition mechanism and/or a link deletion mechanism on the basis that the non-AP MLD is already related with the AP MLD should be defined. In view of this, the following technical schemes according to the embodiments of the present disclosure are proposed. According to the technical schemes of the embodiments of the present disclosure, a multi-link reconfiguration mechanism, where one or more links are added or deleted on the basis that the non-AP MLD has been related with the AP MLD and the multi-link setup has been successfully performed, is defined.

It is to be noted that although the above description is performed taking the non-AP MLD and the AP MLD as the objects, the technical schemes of the embodiments of the present disclosure are not limited thereto. In the embodiments of the present disclosure, the first MLD may be a non-AP MLD, and the second MLD may be an AP MLD; or the first MLD may be an MLD and the second MLD may be a peer MLD. In the case that the first MLD is a non-AP MLD, the affiliated STA of the first MLD is a non-AP STA (simply referred to as an STA). In a case that the second MLD may be an AP MLD, the affiliated STA of the second MLD is an AP.

In order to facilitate understanding of the technical schemes of the embodiments of the present disclosure, the technical schemes of the present disclosure will be described in detail below by way of specific embodiments. The above related technologies, as optional schemes, can be arbitrarily combined with the technical schemes of the embodiments of the present disclosure, all of which belong to the protection scope of the embodiments of the present disclosure. The embodiments of the present disclosure include at least part of following contents.

FIG. 4 is a schematic flowchart of a multi-link reconfiguration method according to an embodiment of the present disclosure, and as illustrated in FIG. 4, the multi-link reconfiguration method includes the operation at 401.

In 401, a first MLD sends a first multi-link element to a second MLD, and/or receives a second multi-link element sent by the second MLD, where the first multi-link element and/or the second multi-link element is used for determining at least one of: a type of multi-link reconfiguration operation, where one type of multi-link reconfiguration is for indicating link addition or another type of multi-link reconfiguration is for indicating link deletion; link information of a first part of links; common information of multiple links; or link information of a link related with the first part of links in the second part of links. The first part of links is a link requested to be added or a link requested to be deleted by the first MLD, and the second part of links is at least one link established between the first MLD and the second MLD when or before performing the multi-link reconfiguration.

In the embodiment of the present disclosure, the first multi-link element and/or the second multi-link element are used for the link addition or the link deletion in the multi-link reconfiguration. The added link or the deleted link may be referred to as a reconfigured link (simply referred to as a reconfiguration link).

In the embodiment of the present disclosure, the first multi-link element and/or the second multi-link element are used for determining at least one of the following:

the type of the multi-link reconfiguration operation, where one type of multi-link reconfiguration is used for indicating the link addition or another type of multi-link reconfiguration is for indicating the link deletion;

the link information of the first part of links;

the common information of multiple links, where in a case that the first part of links is the link requested to be added by the first MLD, the common information of multiple links is common information of the first part of links and the second part of links; and in a case that the first part of links is the link requested to be deleted by the first MLD, the common information of multiple links is common information of remaining links in the second part of links after the first part of links is deleted from the second part of links; or the link information of the link related with the first part of links in the second part of links.

The first part of links is the link requested to be added or the link requested to be deleted by the first MLD, and the second part of links is at least one link established between the first MLD and the second MLD when or before performing the multi-link reconfiguration.

For ease of description, the first part of links may also be described as a reconfiguration link and the second part of links may be described as an established link.

In the above scheme, the link related with the first part of links in the second part of links is a link affected by the first part of links in the second part of links, or a link affected by the reconfiguration link in the second part of links, or a link affected by a reconfiguration operation (a addition link operation or a deletion link operation) in the second part of links. Herein, the term "affect" means that one or more operating parameters and/or capabilities of the link are affected. For example, before the multi-link reconfiguration is performed, the first MLD has a link 1 and a link 2 that are Simultaneous Transmitting and Receiving (STR) link pairs, thus, these two links do not have non-Simultaneous Transmitting and Receiving (NSTR) parameters. When the link reconfiguration is performed, a link 3 is attempted to be added. If the link 3 and the link 2 are NSTR link pairs, the link 2 is the link affected by the addition link operation (the addition operation for the link 3).

Specific implementations of the first multi-link element and the second multi-link element in the embodiments of the present disclosure will be described below.

First Multi-Link Element

In the embodiments of the present disclosure, the first multi-link element includes at least one of the following:

a first multi-link control field for indicating the type of the multi-link reconfiguration operation;

a first common information field for indicating the common information of multiple links; or a first link information field for indicating link information of the first part of links and/or link information of the link related with the first part of links in the second part of links.

Furthermore, in some implementations, the first multi-link element further includes at least one of:

a first element identification (ID) field for indicating an element ID of the first multi-link element;

a first length field for indicating a length of the first multi-link element; or a first element ID extension field for indicating an extension element ID of the first multi-link element.

First Multi-Link Control Field in the First Multi-Link Element

For the first multi-link control field in the first multi-link element, one or more subfields of the first multi-link control field are used for indicating a type and/or a subtype of the first multi-link element, and the type and/or the subtype of the first multi-link element is used for determining the type of the multi-link reconfiguration operation. A format of the first multi-link control field may be, but is not limited to, the following.

1) The first multi-link control field includes a first type subfield for indicating the type and/or the subtype of the first multi-link element.

2) The first multi-link control field includes a first type subfield for indicating the type of the first multi-link element, and a first subtype subfield for indicating the subtype of the first multi-link element.

3) The first multi-link control field includes a first subtype subfield for indicating the subtype of the first multi-link element.

In the above scheme, the type of the first multi-link element is a reconfiguration multi-link element. The subtype of the first multi-link element is a first type of the reconfiguration multi-link element used for link addition in the multi-link reconfiguration, or a second type of the reconfiguration multi-link element used for link deletion in the multi-link reconfiguration.

Since the first type of the reconfiguration multi-link element is used for the link addition in the multi-link reconfiguration, the first type of the reconfiguration multi-link element may be referred to as an addition reconfiguration multi-link element. Similarly, since the second type of the reconfiguration multi-link element is used for the link deletion in the multi-link reconfiguration, the second type of the reconfiguration multi-link element may be referred to as a deletion reconfiguration multi-link element.

Furthermore, in some implementations, the first multi-link control field further includes a first presence bitmap subfield. The first presence bitmap subfield is used for indicating a subfield present in the first common information field of the first multi-link element. In an embodiment, the first presence bitmap subfield includes at least one of following:

a first part of bits for indicating whether a first MLD (MLD) Media Access Control (MAC) address subfield is present in the first common information field;

a second part of bits for indicating whether a first link ID information subfield is present in the first common information field;

a third part of bits for indicating whether a first Basic Service Set (BSS) parameters change count subfield is present in the first common information field;

a fourth part of bits for indicating whether a first Enhanced Multi-Link (EML) capabilities subfield is present in the first common information field; or a fifth part of bits for indicating whether a first MLD capabilities subfield is present in the first common information field.

First Common Information Field in the First Multi-Link Element

The first common information field in the first multi-link element includes at least one of following:

a first common information length subfield for indicating a length of the first common information field;

a first MLD MAC address subfield for indicating an MLD MAC address of the first MLD;

a first link ID information subfield for indicating a link ID corresponding to an affiliated STA sending the first multi-link element or a re-configurated link ID;

a first Basic Service Set (BSS) parameters change count subfield for counting a number of critical updates to BSS parameters;

a first EML capabilities subfield for indicating an EML capability of the first MLD; or a first MLD capabilities subfield for indicating an MLD capability of the first MLD.

The first MLD capabilities subfield in the first common information field includes at least one of following:

a first part of MLD capabilities subfield for indicating a first part of MLD capabilities information affected by the multi-link reconfiguration; or a second part of MLD capabilities subfield for indicating a second part of MLD capabilities information not affected by the multi-link reconfiguration.

In a case that the first part of links is a link requested to be added by the first MLD, the first part of MLD capabilities information indicated by the first part of MLD capabilities subfield is updated according to the first part of links and the second part of link based on the requested multi-link reconfiguration; or, in a case that the first part of links is a link requested to be deleted by the first MLD, the first part of MLD capabilities information indicated by the first part of MLD capabilities subfield is updated, according to the remaining links in the second part of links after the first part of links is deleted from the second part of links, based on the requested multi-link reconfiguration.

In a case that the first MLD capabilities subfield includes the second part of MLD capabilities subfield, the second part of MLD capabilities information indicated by the second part of MLD capabilities subfield is kept consistent with a second part of MLD capabilities information adopted by the second part of links when or before performing the multi-link reconfiguration; or, in a case that the first MLD capabilities subfield does not include the second part of MLD capabilities subfield, the second part of MLD capabilities information is defaulted to be consistent with a second part of MLD capabilities information adopted by the second part of links when or before performing the multi-link reconfiguration.

In some implementations, the first part of MLD capabilities subfield includes at least one of following:

a first maximum number of simultaneous links subfield for indicating a maximum number of simultaneous links; or;

a first frequency separation for Simultaneous Transmitting and Receiving (STR) subfield for indicating a STR frequency spacing between links.

In the case that the first part of links is a link requested to be added by the first MLD, the maximum number of simultaneous links indicated by the first maximum number of simultaneous links subfield is updated, according to link conditions of the first part of links and the second part of links, based on the requested multi-link reconfiguration; or in the case that the first part of links is a link requested to be deleted by the first MLD, the maximum number of simultaneous links indicated by the first maximum number of simultaneous links subfield is updated, according to link conditions of the remaining links in the second part of links after the first part of links is deleted from the second part of links, based on the requested multi-link reconfiguration.

In the case that the first part of links is the link requested to be added by the first MLD, the STR frequency spacing indicated by the first frequency separation for STR subfield is updated based on the requested multi-link reconfiguration according to a STR frequency spacing between the first part of links, a STR frequency spacing between the second part of links, and a STR frequency spacing between the first part of links and the second part of links; or, in the case that the first part of links is the link requested to be deleted by the first MLD, the STR frequency spacing indicated by the first frequency separation for STR subfield is updated based on the requested multi-link reconfiguration according to a STR frequency spacing between remaining links in the second part of links after the first part of links is deleted from the second part of links.

In some implementations, the second part of MLD capabilities subfield includes at least one of following:

a first Single Response Scheduling (SRS) support subfield for indicating a capability for supporting a single response scheduling; or a first Traffic ID (TID)-to-link mapping negotiation support subfield for indicating a capability for supporting a TID-to-link mapping negotiation.

First Link Information Field in the First Multi-Link Element

The first link information field in the first multi-link element includes STA information of an affiliated STA corresponding to each link of the first part of links and/or the links related with the first part of links of the second part of links in the first MLD.

In some embodiments, the STA information is carried in a per-STA profile subelement, and the per-STA profile subelement includes at least one of following:

a first subelement ID subfield for indicating a subelement ID of the per-STA profile subelement;

a first length subfield for indicating a length of the per-STA profile subelement;

a first STA control subfield for indicating STA control information;

a first STA information subfield for indicating STA information; or a first STA profile subfield for indicating STA profile information.

In some implementations, the first STA control subfield in the per-STA profile subelement has following implementations: Option 1-1) and Option 1-2).

In Option 1-1), in a case that the first multi-link element is a first type of multi-link element, the first STA control subfield includes at least one of following:

a first link ID subfield for indicating a target link;

a first link reconfiguration indication subfield for indicating a type of a reconfiguration operation performed on the target link;

a first complete profile subfield for indicating whether the first STA profile subfield carries complete STA profile information;

a first MAC address present subfield for indicating whether a STA MAC address subfield is present in the first STA information subfield;

a first beacon interval present subfield for indicating whether a beacon interval subfield is present in the first STA information subfield;

a first Delivery Traffic Indication Map (DTIM) information present subfield for indicating whether a DTIM information subfield is present in the first STA information subfield;

a first NSTR link pair present subfield for indicating whether an NSTR link pair subfield is present in the first STA information subfield;

a first NSTR bitmap size subfield for indicating a size of an NSTR bitmap; or a first BSS parameters change count present subfield for indicating whether a BSS parameters change count subfield is present in the first STA information subfield.

The first type of the reconfiguration multi-link element is used for the link addition in the multi-link reconfiguration.

In Option 1-2), in a case that the first multi-link element is a second type of multi-link element, the first STA control subfield includes at least one of following:

a first link ID subfield for indicating a target link;

a first link reconfiguration indication subfield for indicating a type of a reconfiguration operation performed on the target link;

a first MAC address present subfield for indicating whether a STA MAC address subfield is present in the first STA information subfield; or a first delete timer present subfield for indicating whether a delete timer subfield is present in the first STA information subfield.

The second type of the reconfiguration multi-link element is used for the link deletion in the multi-link reconfiguration.

The first link reconfiguration indication subfield in the first STA control subfield may have, but is not limited to, two indication manners as follows.

In the first manner, the first link reconfiguration indication subfield is set to be a first value for indicating that a deletion link operation is performed on the target link; or the first link reconfiguration indication subfield is set to be a second value for indicating that a addition link operation is performed on the target link; or the first link reconfiguration indication subfield is set to be a third value for indicating that the target link is a link on which the deletion link operation and the addition link operation are not required to be performed, and/or that the target link is a link on which a link adjustment operation is required to be performed, and/or that the target link is a link related with the first part of links in the second part of links. The link adjustment operation may be, for example, an adjustment operation performed on capabilities and/or parameters of the link.

In the second manner, the first link reconfiguration indication subfield is set to be a first value for indicating that one of a deletion link operation or a addition link operation is performed on the target link; or the first link reconfiguration indication subfield is set to be a second value for indicating that the target link is a link on which the deletion link operation and the addition link operation are not required to be performed, and/or that the target link is a link on which a link adjustment operation is required to be performed, and/or that the target link is a link related with the first part of links in the second part of links.

In some implementations, the first STA information subfield in the per-STA profile subelement has following implementations: Option 2-1) and Option 2-2).

In Option 2-1), in the case that the first multi-link element is the first type of multi-link element, the first STA information subfield includes at least one of following:

a first STA information length subfield;

a first STA MAC address subfield;

a first beacon interval subfield;

a first Timing Synchronization Function (TSF) offset subfield;

a first DTIM information subfield;

a first NSTR indication bitmap subfield;

a first BSS parameters change count subfield; or a first TSF subfield.

In some implementations, a first STA information subfield corresponding to the link related with the first part of links in the second part of links includes a first part of STA information subfield, and the first part of STA information subfield is used for indicating STA information on which update is performed. In an embodiment, the first STA information subfield corresponding to the link related with the first part of links in the second part of links further includes a second part of STA information subfield, and the second part of STA information subfield is used for indicating STA information on which update is not performed. For example, the first part of STA information subfield includes at least one of: a first NSTR indication bitmap subfield; a first beacon interval subfield; a first TSF offset subfield; a first DTIM information subfield; a first NSTR indication bitmap subfield; or a first BSS parameters change count subfield. As an optional scheme, the first STA information subfield in the per-STA profile subelement corresponding to the link (i.e., the link related with the first part of links in the second part of links) affected by the reconfiguration in the first link information field in the first multi-link element sent by the first MLD as a requester for the link reconfiguration carries the first NSTR indication bitmap subfield.

In Option 2-2), in the case that the first multi-link element is the second type of multi-link element, the first STA information subfield includes at least one of following:

a first STA MAC address subfield; or a first delete timer subfield.

In the embodiments of the present disclosure, the operation that the first MLD sends the first multi-link element to the second MLD may be implemented in a first manner and a second manner.

In the first manner, the first MLD sends the first multi-link element to the second MLD through any one of established links in the second part of links.

In the second manner, the first MLD sends the first multi-link element to the second MLD through any one of the to-be-established links in the first part of links. The first part of links is the link requested to be added by the first MLD.

It is to be noted that, for a case that the first multi-link element is carried in an action frame, the first multi-link element (or the action frame carrying the first multi-link element) needs to be sent in the first manner described above.

In some implementations, the first multi-link element is carried in a first action field of a first request frame, the first action field includes a first multi-link element field for indicating the first multi-link element. In an embodiment, the first action field further includes at least one of: a first category field for indicating a category of the first action field; a first protected action field for indicating a protected action; or, a first dialog token field for indicating a dialog token corresponding to the first request frame.

Second Multi-Link Element

In the embodiments of the present disclosure, the second multi-link element includes at least one of following:

a second multi-link control field for indicating the type of the multi-link reconfiguration operation;

a second common information field for indicating the common information of multiple links; or a second link information field for indicating link information of the first part of links and/or link information of the link related with the first part of links in the second part of links.

Furthermore, in some implementations, the second multi-link element further includes at least one of:

a second element ID field for indicating an element ID of the second multi-link element;

a second length field for indicating a length of the second multi-link element; or a second element ID extension field for indicating an extension element ID of the second multi-link element.

Second Multi-Link Control Field in the Second Multi-Link Element

For the second multi-link control field in the second multi-link element, one or more subfields of the second multi-link control field are used for indicating a type and/or a subtype of the second multi-link element, and the type and/or the subtype of the second multi-link element is used for determining the type of the multi-link reconfiguration operation. A format of the second multi-link control field may be, but is not limited to, the following.

1) The second multi-link control field includes a second type subfield for indicating the type and/or the subtype of the second multi-link element.

2) The second multi-link control field includes a second type subfield for indicating the type of the second multi-link element, and a second subtype subfield for indicating the subtype of the second multi-link element.

3) The second multi-link control field includes a second subtype subfield for indicating the subtype of the second multi-link element.

In the above scheme, the type of the second multi-link element is a reconfiguration multi-link element. The subtype of the second multi-link element is a first type of the reconfiguration multi-link element for link addition in the multi-link reconfiguration, or a second type of the reconfiguration multi-link element for link deletion in the multi-link reconfiguration.

Since the first type of the reconfiguration multi-link element is used for the link addition in the multi-link reconfiguration, the first type of the reconfiguration multi-link element may be referred to as an addition reconfiguration multi-link element. Similarly, since the second type of the reconfiguration multi-link element is used for the link deletion in the multi-link reconfiguration, the second type of the reconfiguration multi-link element may be referred to as a deletion reconfiguration multi-link element.

Furthermore, in some implementations, the second multi-link control field further includes a second presence bitmap subfield for indicating a subfield present in the second common information field of the second multi-link element. In an embodiment, the second presence bitmap subfield includes at least one of following:

a sixth part of bits for indicating whether a second MLD MAC address subfield is present in the second common information field;

a seventh part of bits for indicating whether a second link ID information subfield is present in the second common information field;

an eighth part of bits for indicating whether a second BSS parameters change count subfield is present in the second common information field;

a ninth part of bits for indicating whether a second EML capabilities subfield is present in the second common information field; or a tenth part of bits for indicating whether a second MLD capabilities subfield is present in the second common information field.

Second Common Information Field in the Second Multi-Link Element

The second common information field in the second multi-link element includes at least one of following:

a second common information length subfield for indicating a length of the second common information field;

a second MLD MAC address subfield for indicating an MLD MAC address of the second MLD;

a second link ID information subfield for indicating a link ID corresponding to an affiliated STA sending the second multi-link element or a re-configured link ID;

a second BSS parameters change count subfield for counting a number of critical updates to BSS parameters;

a second EML capabilities subfield for indicating an EML capability of the second MLD; or a second MLD capabilities subfield for indicating an MLD capability of the second MLD.

The second MLD capabilities subfield in the second common information field includes at least one of following:

a third part of MLD capabilities subfield for indicating a third part of MLD capabilities information affected by the multi-link reconfiguration; or a fourth part of MLD capabilities subfield for indicating a fourth part of MLD capabilities information not affected by the multi-link reconfiguration.

In a case that the first part of links is a link requested to be added by the first MLD, the third part of MLD capabilities information indicated by the third part of MLD capabilities subfield is updated based on the requested multi-link reconfiguration according to the first part of links and the second part of links; or, in a case that the first part of links is a link requested to be deleted by the first MLD, the third part of MLD capabilities information indicated by the third part of MLD capabilities subfield is updated, according to the remaining links in the second part of links after the first part of links is deleted from the second part of links, based on the requested multi-link reconfiguration.

In a case that the second MLD capabilities subfield includes the fourth part of MLD capabilities subfield, the fourth part of MLD capabilities information indicated by the fourth part of MLD capabilities subfield is kept consistent with a fourth part of MLD capabilities information adopted by the second part of links when or before performing multi-link reconfiguration; or, in a case that the second MLD capabilities subfield does not include the fourth part of MLD capabilities subfield, the fourth part of MLD capabilities information is defaulted to be consistent with a fourth part of MLD capabilities information adopted by the second part of links when or before performing multi-link reconfiguration.

In some implementations, the third part of MLD capabilities subfield includes at least one of following:

a second maximum number of simultaneous links subfield for indicating a maximum number of simultaneous links; or a second frequency separation for STR subfield for indicating a STR frequency spacing between links.

In the case that the first part of links is a link requested to be added by the first MLD, the maximum number of simultaneous links indicated by the second maximum number of simultaneous links subfield is updated, according to link conditions of the first part of links and the second part of links, based on the requested multi-link reconfiguration; or in the case that the first part of links is a link requested to be deleted by the first MLD, the maximum number of simultaneous links indicated by the second maximum number of simultaneous links subfield is updated, according to link conditions of the remaining links in the second part of links after the first part of links is deleted from the second part of links, based on the requested multi-link reconfiguration.

In the case that the first part of links is the link requested to be added by the first MLD, the STR frequency spacing indicated by the second frequency separation for STR subfield is updated based on the requested multi-link reconfiguration according to a STR frequency spacing between the first part of links, a STR frequency spacing between the second part of links, and a STR frequency spacing between the first part of links and the second part of links; or, in the case that the first part of links is the link requested to be deleted by the first MLD, the STR frequency spacing indicated by the second frequency separation for STR subfield is updated based on the requested multi-link reconfiguration according to a STR frequency spacing between remaining links in the second part of links after the first part of links is deleted from the second part of links.

In some implementations, the fourth part of MLD capabilities subfield includes at least one of following:

a second SRS support subfield for indicating a capability for supporting a single response scheduling; or a second TID-to-link mapping negotiation support subfield for indicating a capability for supporting a TID-to-link mapping negotiation.

Second Link Information Field in the Second Multi-Link Element

The second link information field in the second multi-link element includes STA information of an affiliated STA corresponding to each link of the first part of links and/or the links related with the first part of links of the second part of links in the second MLD.

In some embodiments, the STA information is carried in a per-STA profile subelement, and the per-STA profile subelement includes at least one of following:

a second subelement ID subfield for indicating a subelement ID of the per-STA profile subelement;

a second length subfield for indicating a length of the per-STA profile subelement;

a second STA control subfield for indicating STA control information;

a second STA information subfield for indicating STA information; or a second STA profile subfield for indicating STA profile information.

In some implementations, the second STA control subfield in the per-STA profile subelement has following implementations: Option 3-1) and Option 3-2).

In Option 3-1), in a case that the second multi-link element is a first type of multi-link element, the second STA control subfield includes at least one of following:

a second link ID subfield for indicating a target link;

a second link reconfiguration indication subfield for indicating a type of a reconfiguration operation performed on the target link;

a second complete profile subfield for indicating whether the first STA profile subfield carries complete STA profile information;

a second MAC address present subfield for indicating whether a STA MAC address subfield is present in the first STA information subfield;

a second beacon interval present subfield for indicating whether a beacon interval subfield is present in the first STA information subfield;

a second DTIM information present subfield for indicating whether a DTIM information subfield is present in the first STA information subfield;

a second NSTR link pair present subfield for indicating whether an NSTR link pair subfield is present in the first STA information subfield;

a second NSTR bitmap size subfield for indicating a size of an NSTR bitmap; or a second BSS parameters change count present subfield for indicating whether a BSS parameters change count subfield is present in the first STA information subfield.

The second type of the reconfiguration multi-link element is used for the link addition in the multi-link reconfiguration.

In Option 3-2), in a case that the second multi-link element is a second type of multi-link element, the second STA control subfield includes at least one of following:

a second link ID subfield for indicating a target link;

a second link reconfiguration indication subfield for indicating a type of a reconfiguration operation performed on the target link;

a second MAC address present subfield for indicating whether a STA MAC address subfield is present in the second STA information subfield; or a second delete timer present subfield for indicating whether a delete timer subfield is present in the second STA information subfield.

The second type of the reconfiguration multi-link element is used for the link deletion in the multi-link reconfiguration.

The second link reconfiguration indication subfield in the second STA control subfield may have, but is not limited to, two indication manners: a first manner and a second manner.

In the first manner, the second link reconfiguration indication subfield is set to be a first value for indicating that a deletion link operation is performed on the target link; or, the second link reconfiguration indication subfield is set to be a second value for indicating that a addition link operation is performed on the target link; or, the second link reconfiguration indication subfield is set to be a third value for indicating that the target link is a link on which the deletion link operation and the addition link operation are not required to be performed, and/or that the target link is a link on which a link adjustment operation is required to be performed, and/or that the target link is a link related with the first part of links in the second part of links.

In the second manner, the second link reconfiguration indication subfield is set to be a first value for indicating that one of a deletion link operation or a addition link operation is performed on the target link; or, the second link reconfiguration indication subfield is set to be a second value for indicating that the target link is a link on which the deletion link operation and the addition link operation are not required to be performed, and/or that the target link is a link on which a link adjustment operation is required to be performed, and/or that the target link is a link related with the first part of links in the second part of links.

In some implementations, the second STA information subfield in the per-STA profile subelement has following implementations: Option 4-1) and Option 4-2).

In Option 4-1), in the case that the second multi-link element is the first type of multi-link element, the second STA information subfield includes at least one of following:

a second STA information length subfield;

a second STA MAC address subfield;

a second beacon interval subfield;

a second TSF offset subfield;

a second DTIM information subfield;

a second NSTR indication bitmap subfield;

a second BSS parameters change count subfield; or a second TSF subfield.

In some implementations, a second STA information subfield corresponding to the link related with the first part of links in the second part of links includes a third part of STA information subfield, and the third part of STA information subfield is used for indicating STA information on which update is performed. In an embodiment, the second STA information subfield corresponding to the link related with the first part of links in the second part of links further includes a fourth part of STA information subfield, and the fourth part of STA information subfield is used for indicating STA information on which update is not performed. As an example, the third part of STA information subfield includes at least one of: a second NSTR bitmap subfield; a second beacon interval subfield; a second TSF offset subfield; a second DTIM information subfield; a second NSTR indication bitmap subfield; or a second BSS parameters change count subfield. As an optional scheme, the second STA information subfield in the per-STA profile subelement corresponding to the link (i.e., the link related with the first part of links in the second part of links) affected by the reconfiguration in the second link information field in the second multi-link element sent by the second MLD as a responder for the link reconfiguration carries the second beacon interval subfield, the second TSF offset subfield, the second DTIM information subfield, the second NSTR indication bitmap subfield, and the second BSS parameters change count subfield.

In Option 4-2), in the case that the second multi-link element is the second type of multi-link element, the second STA information subfield includes at least one of following:

a second STA MAC address subfield; or a second delete timer subfield.

In some implementations, the second STA profile subfield in the per-STA profile subelement includes a status code. For an addition link accepted by the second MLD, a status code included in the second STA profile subfield of the per-STA profile subelement corresponding to the link indicates success of link addition; and for an addition link denied by the second MLD, the status code included in the second STA profile subfield of the per-STA profile subelement corresponding to the link indicates failure of link addition.

In the embodiments of the present disclosure, the operation that the first MLD sends the first multi-link element to the second MLD may be implemented in the following manner.

The first MLD receives the second multi-link element sent by the second MLD on a link on which the first MLD sends the first multi-link element.

It is to be note that, for a case that the second multi-link element is carried in an action frame, the second multi-link element (or the action frame carrying the second multi-link element) needs to be sent through any one of the established links in the second part of links.

In some implementations, the second multi-link element is carried in a second action field of a first response frame, the second action field includes a second multi-link element field for indicating the second multi-link element. In an embodiment, the second action field further includes at least one of: a second category field for indicating a category of the second action field; a second protected action field for indicating a protected action; a second dialog token field for indicating a dialog token corresponding to the first response frame; or, a status code field for indicating whether the requested multi-link reconfiguration is accepted. A value of the dialog token corresponding to the first response frame is the same as the value of the dialog token corresponding to the first request frame in the above scheme.

Different values of the status code field indicate acceptance conditions for the addition link by the second MLD. In some implementations, the status code field is set to be a first value for indicating that the second MLD accepts setup requests for all addition links; the status code field is set to be a second value for indicating that the second MLD denies setup requests for all addition links; and the status code field is set to be a third value for indicating that the second MLD accepts setup requests for a part of addition links and/or denies setup requests for a part of addition links.

In the embodiments of the present disclosure, in the case that the first part of links is the link requested to be added by the first MLD, after the first part of links is added, a first part of parameters used by the first part of links and the second part of links is unchanged; and/or a second part of parameters used by the first part of links is re-established.

In some implementations, the first part of parameters includes at least one of: a Pairwise Transient Key (PTK), or an Association ID (AID).

In some implementations, the second part of parameters includes at least one of: a Group Temporal Key (GTK), an Integrity Group Temporal Key (IGTK), and a Beacon Integrity Group Temporal Key (BIGTK).

In the above schemes, the first MLD performs interaction of handshake messages with the second MLD, and the interaction of the handshake messages is used for establishing the second part of parameters for the first part of links.

The above-described schemes of the embodiments of the present disclosure will be illustrated below in conjunction with specific application examples.

As an application example, the first multi-link element and the second multi-link element in the above schemes are collectively referred to as the multi-link element. The multi-link element may also be referred to as a reconfiguration multi-link element, and the reconfiguration multi-link element is used for carrying at least one of the following information in a multi-link reconfiguration operation (such as the operation of adding or deleting one or more links): the type of the multi-link reconfiguration operation, the common information of multiple links (i.e. MLD-level information of the first MLD), link information of the first part of links (i.e. link information of the reconfiguration link), link information of a link (i.e. the link affected by the reconfiguration operation in the established links) related with the first part of links in the second part of links. The first part of links (i.e., the reconfiguration link) is a link requested to be added or a link requested to be deleted by the first MLD, or a link required to be added or deleted in the reconfiguration operation. The second part of links (i.e., the established link) is a link established between the first MLD and the second MLD when or before performing the multi-link reconfiguration. The link information of the link (i.e. the link affected by the reconfiguration operation in the established links) related with the first part of links in the second part of links is a link in the established links whose capabilities and/or operation parameters are affected by the reconfiguration operation.

In one example, a format of the multi-link element is illustrated in FIG. 5, including an element ID field, a length field, an element ID extension field, a multi-link control field, a common info field, and a link info field, and the content indicated by each field may refer to the foregoing related description. It is to be noted that the format illustrated in FIG. 5 is merely an exemplary illustration, and the format of the multi-link element may be changed on the basis of the format illustrated in FIG. 5. For example, compared with the format illustrated in FIG. 5, the multi-link element may include more or fewer fields, for example, the location of each field included in the multi-link element and the number of octets occupied by each field may be different from those illustrated in FIG. 5.

In one example, a format of the multi-link control field in the multi-link element is illustrated in FIG. 6, including: a type subfield, a subtype subfield, and a presence bitmap subfield, and the content indicated by each field may refer to the foregoing related description. It is to be noted that the format illustrated in FIG. 6 is merely an exemplary illustration, and the format of the multi-link control field may be changed on the basis of the format illustrated in FIG. 6. For example, compared with the format illustrated in FIG. 6, the multi-link control field may include more or fewer subfields, for example, the location of each subfield included in the multi-link control field and the number of octets occupied by each subfield may be different from those illustrated in FIG. 6.

As one implementation, the multi-link control field includes the type subfield and the subtype subfield. Encoding of the type subfield and the subtype subfield are illustrated in Table 2-1 and Table 2-2. The type subfield is set to be a specific value (such as 2) for indicating that the type of the multi-link element is the reconfiguration multi-link element, different values of the subtype subfield are used for indicating different types of the reconfiguration multi-link elements. For example, the subtype subfield is set to be a first value (such as 1) for indicating the first type of the reconfiguration multi-link element (which may also be

TABLE 2-1

| Type subfield value | Multi-link element type |
| --- | --- |
| specific value (e.g. 2) | Reconfiguration multi-link element |

TABLE 2-2

| Subtype subfield value | Multi-link element subtype |
| --- | --- |
| First value (e.g. 1) | First type of the reconfiguration multi-link element (Addition reconfiguration multi-link element) |
| Second value (e.g. 0) | Second type of the reconfiguration multi-link element (Deletion reconfiguration multi-link element) |

As one implementation, the multi-link control field includes the type subfield and encoding of the type subfield is illustrated in Table 2-3. Different values of the type subfield are used for indicating different types of the reconfiguration multi-link elements. For example, the type subfield is set to be a first value (such as 1) for indicating that the type of the multi-link element is the reconfiguration multi-link element and the first type of the reconfiguration multi-link element (which may also be referred to as the addition reconfiguration multi-link element). The first type of the reconfiguration multi-link element is used for adding one or more links in the multi-link reconfiguration. The type subfield is set to be a second value (such as 0) for indicating that the type of the multi-link element is the reconfiguration multi-link element and the second type of the reconfiguration multi-link element (which may also be referred to as the deletion reconfiguration multi-link element). The second type of the reconfiguration multi-link element is used for deleting one or more links in the multi-link reconfiguration.

TABLE 2-3

| Type subfield value | Multi-link element type | Multi-link element subtype |
| --- | --- | --- |
| First value (e.g. 1) | Reconfiguration multi-link element | First type of the reconfiguration multi-link element (Addition reconfiguration multi-link element) |
| Second value (e.g. 0) | Reconfiguration multi-link element | Second type of the reconfiguration multi-link element (Deletion reconfiguration multi-link element) | referred to as the addition reconfiguration multi-link element), and the first type of the reconfiguration multi-link element is used for adding one or more links in the multi-link reconfiguration. The subtype subfield is set to be a second value (such as 0) for indicating the second type of the reconfiguration multi-link element (which may also be referred to as the deletion reconfiguration multi-link element), and the second type of the reconfiguration multi-link element is used for deleting one or more links in the multi-link reconfiguration.

As one implementation, the multi-link control field may not include a subfield (e.g., the subtype subfield, and the type subfield) for indicating the type and/or the subtype of the multi-link element. In this case, the location corresponding to the subfield is reserved, and whether the current reconfiguration operation is an addition link operation or a deletion link operation is indicated by information in the link information field of the multi-link element. If the reconfiguration operation is the addition link operation, the type of the corresponding multi-link element is the reconfiguration multi-link element and the first type of the reconfiguration multi-link element (which may also be referred to as the addition reconfiguration multi-link element). If the reconfiguration operation is the deletion link operation, the type of the corresponding multi-link element is the reconfiguration multi-link element and the second type of the reconfiguration multi-link element (which may also be referred to as the deletion reconfiguration multi-link element).

As one implementation, the multi-link control field may include a presence bitmap subfield for indicating which subfields are present in the common information field of the multi-link element. In one example, for the first type of the reconfiguration multi-link element (which may also be referred to as the addition reconfiguration multi-link element), the format of the presence bitmap subfield in the multi-link control field of the multi-link element is illustrated in FIG. 7, including: an MLD MAC address present subfield, a link ID info present subfield, a BSS parameters change count present subfield, an EML capabilities present subfield, and an MLD capabilities present subfield, and the content indicated by each field may refer to the foregoing related description. It is to be noted that the format illustrated in FIG. 7 is merely an exemplary illustration, and the format of the presence bitmap subfield may be changed on the basis of the format illustrated in FIG. 7. For example, compared with the format illustrated in FIG. 7, the presence bitmap subfield may include more or fewer subfields, for example, the location of each subfield included in the presence bitmap subfield and the number of octets occupied by each subfield may be different from those illustrated in FIG. 7.

In one example, the format of the common information field in the multi-link element is illustrated in FIG. 8, including: a common info length subfield, an MLD MAC address subfield, a link ID info subfield, a BSS parameters change count subfield, an EML capabilities subfield, and an MLD capabilities subfield, and the content indicated by each field may refer to the foregoing related description. It is to be noted that the format illustrated in FIG. 8 is merely an exemplary illustration, and the format of the common information field may be changed on the basis of the format illustrated in FIG. 8. For example, compared with the format illustrated in FIG. 8, the common information field may include more or fewer subfields, for example, the location of each subfield included in the common information field and the number of octets occupied by each subfield may be different from those illustrated in FIG. 8. It is to be pointed out that information indicated by subfields carried in the common information field other than the link ID subfield and the BSS parameters change count subfield is common information of all links (such as, the established links and the addition link, or remaining links in the established links after a link is deleted from the established links). The MLD MAC address subfield is used for indicating an MAC address of an MLD with which the affiliated STA sending the multi-link element is associated, and the MAC address is consistent with the MLD MAC address adopted by the MLD for the established link. The MLD capabilities subfield is used for indicating MLD capabilities information affected by the multi-link reconfiguration and/or MLD capabilities information not affected by the multi-link reconfiguration. As an example, the MLD capabilities information affected by the multi-link reconfiguration has the maximum number of simultaneous links (indicated by the maximum number of simultaneous links subfield), frequency separation for STR (indicated by the frequency separation for STR subfield). As an example, the MLD capabilities information not affected by the multi-link reconfiguration has a capability for supporting the SRS (indicated by the SRS support subfield) and a capability for supporting the TID-to-link mapping negotiation (indicated by the TID-to-link mapping negotiation support subfield). For the case of link addition, the MLD capabilities information affected by the multi-link reconfiguration is updated based on the conditions of the addition link and the established links; and for the case of link deletion, the MLD capabilities information affected by the multi-link reconfiguration is updated based on the conditions of the remaining links in the established links after a link is deleted from the established links. For the MLD capabilities information not affected by the multi-link reconfiguration, the MLD capabilities subfield may include a subfield for indicating the MLD capabilities information or may not include the subfield for indicating the MLD capabilities information, and the MLD capabilities information not affected by the multi-link reconfiguration is kept consistent with the MLD capabilities information adopted for the established links.

The link information field in the multi-link element carries link information of the reconfiguration link and/or the link affected by the reconfiguration operation in the established links. The link information herein is STA information of an affiliated STA operating on the link in the MLD, and the STA information is carried in the per-STA profile subelement. In one example, the format of the per-STA profile subelement is illustrated in FIG. 9, including a subelement ID subfield, a length subfield, a STA control subfield, a STA info subfield, and a STA profile subfield, and the content indicated by each field may refer to the foregoing related description. It is to be noted that the format illustrated in FIG. 9 is merely an exemplary illustration, and the format of the per-STA profile subelement may be changed on the basis of the format illustrated in FIG. 9. For example, compared with the format illustrated in FIG. 9, the per-STA profile subelement may include more or fewer subfields, for example, the location of each subfield included in the per-STA profile subelement and the number of octets occupied by each subfield may be different from those illustrated in FIG. 9.

In one example, for the first type of the reconfiguration multi-link element (i.e., addition reconfiguration multi-link element), the format of the STA control subfield is illustrated in FIG. 10-1, including: a link ID subfield, a link reconfiguration indication subfield, a complete profile subfield, a STA MAC address present subfield, a beacon interval present subfield, a DTIM info present subfield, a NSTR link pair present subfield, a NSTR bitmap size subfield, and a BSS parameters change count present subfield. The content indicated by each field may refer to the foregoing related description. For the second type of the reconfiguration multi-link element (i.e., deletion reconfiguration multi-link element), the format of the STA control subfield is illustrated in FIG. 10-2, including: a link ID subfield, a link reconfiguration indication subfield, a complete profile subfield, an MAC address present subfield, and a delete timer present subfield. The content indicated by each field may refer to the foregoing related description. It is to be noted that the formats illustrated in FIG. 10-1 and FIG. 10-2 are merely exemplary illustrations, and the format of the STA control subfield may be changed on the basis of the formats illustrated in FIG. 10-1 and FIG. 10-2. For example, compared with the formats illustrated in FIG. 10-1 and FIG. 10-2, the STA control subfield may include more or fewer subfields, for example, the location of each subfield and the number of octets occupied by each subfield may be different from those illustrated in FIG. 10-1 and FIG. 10-2.

Encoding of the link reconfiguration indication subfield in the above STA control subfield may be as follows.

As an example, as illustrated in Table 3-1, the link reconfiguration indication subfield occupies 2 bits, and the link reconfiguration indication subfield is set to be a first value (e.g., 0) for indicating a link deletion operation, i.e., the link deletion operation is performed on the link indicated by the link ID subfield in the STA control subfield. The link reconfiguration indication subfield is set to be a second value (e.g., 1) for indicating a link addition operation, i.e., the addition link operation is performed on the link indicated by the link ID subfield in the STA control subfield. The link reconfiguration indication subfield is set to be a third value (e.g., 2) for indicating an established link affected by the reconfiguration operation, i.e., the link indicated by the link ID subfield in the STA control subfield is the established link affected by the reconfiguration operation, or for indicating a link on which the addition operation or deletion operation is not performed but the related information and parameters of the link are adjusted, i.e., the link indicated by the link ID subfield in the STA control subfield is the link on which the addition operation or deletion operation is not performed but adjustment of the related information and parameters of the link is performed.

TABLE 3-1

| Value of link reconfiguration indication subfield | Indicated content |
| --- | --- |
| First value (e.g. 0) | Indicating the link deletion operation, i.e., the link deletion operation is performed on the link indicated by the link ID subfield in the STA control subfield |
| Second value (e.g. 1) | Indicating the link addition operation, i.e., the link addition operation is performed on the link indicated by the link ID subfield in the STA control subfield |
| Third value (e.g. 2) | Indicating an established link affected by the reconfiguration operation, i.e., the link indicated by the link ID subfield in the STA control subfield is the established link affected by the reconfiguration operation, or indicating the link on which the addition operation or deletion operation is not performed but the related information and parameters of the link are adjusted, i.e., the link indicated by the link ID subfield in the STA control subfield is the link on which the addition operation or deletion operation is not performed but adjustment of the related information and parameters of the link is performed |
| Other values (e.g. 3) | Reserved |

As an example, as illustrated in Table 3-2, the link reconfiguration indication subfield occupies 1 bit, and the link reconfiguration indication subfield is set to be a first value (e.g., 0) for indicating one of the link deletion operation or the link addition operation. That is to say, one of the link deletion operation or the link addition operation is performed on the link indicated by the link ID subfield in the STA control subfield, where whether the link deletion operation or the link addition operation is performed is specifically indicated by the type subfield and/or the subtype subfield of the multi-link control field. The link reconfiguration indication subfield is set to be a second value (e.g., 1) for indicating an established link affected by the reconfiguration operation, i.e., the link indicated by the link ID subfield in the STA control subfield is the established link affected by the reconfiguration operation, or for indicating a link on which the addition operation or deletion operation is not performed but the related information and parameters of the link are adjusted, i.e., the link indicated by the link ID subfield in the STA control subfield is the link on which the addition operation or deletion operation is not performed but the related information and parameters of the link are adjusted.

TABLE 3-2

| Value of link reconfiguration indication subfield | Indicated content |
| --- | --- |
| First value (e.g. 0) | Indicating one of the link deletion operation or the link addition operation, i.e., one of the link deletion operation or the link addition operation is performed on the link indicated by the link ID subfield in the STA control subfield, where whether the link deletion operation or the link addition operation is performed is indicated by the type subfield and/or the subtype subfield of the multi-link control field |
| Second value (e.g. 1) | Indicating an established link affected by the reconfiguration operation, i.e., the link indicated by the link ID subfield in the STA control subfield is the established link affected by the reconfiguration operation; or indicating a link on which the addition operation or deletion operation is not performed but the related information and parameters of the link are adjusted, i.e., the link indicated by the link ID subfield in the STA control subfield is the link on which the addition operation or deletion operation is not performed but the related information and parameters of the link are adjusted |

According to whether the multi-link control field carries a subfield (such as the subtype subfield or the type subfield) indicating the subtype of the multi-link element, it is determined whether to adopt the encoding format of the link reconfiguration indication subfield illustrated in Table 3-1 or the encoding format of the link reconfiguration indication subfield illustrated in Table 3-2. Specifically, when the multi-link control field does not carry the subfield (such as the subtype subfield or the type subfield) indicating the subtype of the multi-link element, the encoding format of the link reconfiguration indication subfield illustrated in Table 3-1 is adopted. When the multi-link control field carries the subfield (such as the subtype subfield or the type subfield) indicating the subtype of the multi-link element, the encoding format of the link reconfiguration indication subfield illustrated in Table 3-2 is adopted.

It is to be noted that, when a reporting STA of the multi-link element is a non-AP STA, a rule that the STA profile field corresponding to a reported non-AP STA in the multi-link element includes fields and elements is consistent with a rule that the STA profile field corresponding to a reported non-AP STA when the basic multi-link element is carried by the association request frame includes fields and elements. When the reporting STA of the multi-link element is an AP, a rule that the STA profile field corresponding to a reported AP (i.e., the AP corresponding to the addition link) in the multi-link element includes fields and elements is consistent with a rule that the STA profile field corresponding to a reported AP when the basic multi-link element is carried by the association response frame includes fields and elements.

As another application example, a first request frame where the first multi-link element in the above scheme is located is referred to as a multi-link reconfiguration request frame, and a first response frame where the second multi-link element in the above scheme is located is referred to as a multi-link reconfiguration response frame. The multi-link reconfiguration request frame is used for performing a multi-link reconfiguration request, and the multi-link reconfiguration response frame is used for replying to the multi-link reconfiguration request frame to indicate acceptance or denial of the multi-link reconfiguration request. The multi-link reconfiguration request frame is sent by the first MLD, and the multi-link reconfiguration response frame is sent by the second MLD. Taking the request for establishing an addition link as an example, when the first MLD has successfully completed the multi-link setup with the second MLD, i.e., after the first MLD is related with the second MLD, if the first MLD still has an unassociated affiliated STA and the first MLD finds that the second MLD has an affiliated STA unrelated with the first MLD, then the first MLD initiates the multi-link reconfiguration request to the second MLD on the established link by using the multi-link reconfiguration request frame to request for adding one or more links.

In one example, a format of an action field of the multi-link reconfiguration request frame is illustrated in Table 4, including: a category field, a protected action field, a dialog token field, and a reconfiguration multi-link element field, and the content indicated by each field may refer to the foregoing related description. It is to be noted that the dialog token field is set to be a non-zero value by an affiliated STA sending the multi-link reconfiguration request frame and is used for identifying the request/response. The reconfiguration multi-link element carries the first multi-link element in the above scheme, and the type of the first multi-link element may be the addition reconfiguration multi-link element or the deletion reconfiguration multi-link element.

TABLE 4

| Order | Information field |
| --- | --- |
| 1 | Category |
| 2 | Protected action |
| 3 | Dialog token |
| 4 | Reconfiguration multi-link element |

In one example, a format of an action field of the multi-link reconfiguration response frame is illustrated in Table 5, including: a category field, a protected action field, a dialog token field, a status code field, and a reconfiguration multi-link element field. The content indicated by each field may refer to the foregoing related description. It is to be noted that, when the multi-link reconfiguration response frame is sent as a response to the multi-link reconfiguration request frame, a dialog token value of the multi-link reconfiguration response frame is a dialog token value of the corresponding multi-link reconfiguration request frame. The reconfiguration multi-link element carries the second multi-link element in the above scheme, and the type of the second multi-link element may be the addition reconfiguration multi-link element or the deletion reconfiguration multi-link element.

29

TABLE 5

| Order | Information field |
|---|---|
| 1 | Category |
| 2 | Protected action |
| 3 | Dialog token |
| 4 | Status code |
| 5 | Reconfiguration multi-link element |

In one example, encoding of the status code field in the above scheme is illustrated in Table 6, and different values of the status code field are used for indicating acceptance conditions for the addition link by the second MLD. The status code field is set to be a first value (e.g., 0) for indicating that setup requests for all addition links are accepted. The value of the status code be named may as ACCEPTED_LINK_RECONFIGURATION_ADDITION, or the value of the status code indicates that the setups of all requested addition links are completed, i.e., a non-AP STA corresponding to each addition link requested by the first MLD is related with a respective AP of the second MLD. The status code field is set to be a second value (e.g., 1) for indicating that setup requests for all addition links are denied. The value of the status code may be named as DENIED_LINK_RECONFIGURATION_ADDITION. The status code field is set to be a third value (e.g., 2) for indicating that setup requests for a part of addition links are accepted and/or setup requests for a part of addition links are denied. The value of the status code may be named as PARTIALLY_ACCEPTED_LINK_RECONFIGURA-TION_ADDITION. In other words, the value of the status code indicates that the setups of the requested part of the addition links are completed, but simultaneously, the setups of the requested part of the addition links are also denied.

TABLE 6

| Status Code | Name | Meaning |
|---|---|---|
| First value (e.g. 0) | ACCEPTED_LINK_RECONFIGURATION_ADDITION | Accepting setup requests for all addition links |
| Second value (e.g. 1) | DENIED_LINK_RECONFIGURATION_ADDITION | Denying setup requests for all addition links |
| Third value (e.g. 2) | PARTIALLY_ACCEPTED_LINK_RECONFIGURATION_ADDITION | Accepting setup requests for a part of addition links and/or denying setup requests for a part of addition links |

As another application example, the first MLD is a non-AP MLD, and the second MLD is an AP MLD. After the non-AP MLD has successfully completed the multi-link setup and association with the AP MLD, when the non-AP MLD needs to establish an addition link or delete an established link with the AP MLD, the non-AP MLD performs interaction of a multi-link reconfiguration request frame and a multi-link reconfiguration response frame with the AP MLD. The multi-link reconfiguration request frame carries the first multi-link element in the above scheme, and the multi-link reconfiguration response frame carries the second multi-link element in the above scheme. The non-AP MLD may send the multi-link reconfiguration request frame to the AP MLD on the established link to request for adding one or more links or deleting one or more established links, and the AP MLD may send the multi-link reconfiguration response frame to the non-AP MLD on the link on which the multi-link reconfiguration request frame is received to reply to the multi-link reconfiguration request frame. In the multi-link reconfiguration request frame, the non-AP MLD indicates, through the first multi-link element, link information of the reconfiguration link and/or the link affected by the reconfiguration operation. In the multi-link reconfiguration response frame, the AP MLD indicates, through the second multi-link element, links that have been successfully added and/or the links that have been denied to be added, and link information of these links.

For the case that the non-AP MLD requests addition links, the AP MLD may accept all addition links requested to be established or a part of addition links requested to be established. It is to be pointed out that, the non-AP MLD needs to ensure that different non-overlapping channels are used between the addition links requested to be established and between the addition links requested to be established and the links that have been successfully established. The AP MLD needs to ensure that different non-overlapping channels are used between the addition links accepted to be established and between the addition links and the links that have been successfully established. After the addition link is successfully established between the non-AP MLD and the AP MLD, the non-AP MLD and the AP MLD establish a multi-link operation including the addition link that is successfully established and the link that has been successfully established before the addition link is established. After the addition link setup is completed, one or more established links (including the successfully added link) will continue to use the existing MLD-level operation and management parameters (such as PTK, AID, etc.) that are not affected by the addition link operation, the operation and management parameters (such as the maximum number of simultaneous links field) at the MLD level or common to the established links that are affected by the addition link operation are updated, and the operation and management parameters (such as GTK, IGTK, BIGTK, etc.) specific to the addition link are newly established. In particular, a successfully established addition link between the non-AP MLD and the AP MLD uses the PTK formed by the successfully established link before the addition link is successfully established, to encrypt and decrypt a unicast frame, and the non-AP MLD and the AP MLD perform a multicast key handshake protocol for the successfully established addition link and establish GTK, IGTK, and BIGTK of the addition link. When the non-AP MLD initiates the addition multi-link reconfiguration to the AP MLD to establish one or more addition links, the non-AP MLD may send the addition multi-link reconfiguration request frame through one of the successfully established links, and the AP MLD returns the addition multi-link reconfiguration response frame on the corresponding link. The addition reconfiguration multi-link element carried by the addition multi-link reconfiguration request frame includes a common information field and a link information field. The common information field includes an MLD MAC address subfield, an MLD capabilities subfield and an EML capabilities subfield, and does not include a link ID information subfield, a BSS parameters change count subfield, and a media synchronization delay information subfield. The link information field includes a per-STA profile subelement corresponding to the addition link and/or per-STA profile subelements of other established links affected by the addition link. For each per-STA profile subelement of the link information field, the complete profile subfield of the STA control field is set to be 1. For a non-AP station requesting addition link setup with an affiliated AP of the AP MLD, the link ID subfield of the STA control field in the corresponding per-STA profile subelement is set as the link ID of the affiliated AP operating on the link of the AP MLD. The non-AP MLD may acquire a link ID of an affiliated AP corresponding to the non-AP station requesting the addition link in the AP MLD at the multi-link discovery stage and the discovery stage of the AP MLD. The affiliated AP in the AP MLD that replies to the addition multi-link reconfiguration request frame carries the addition reconfiguration multi-link element in the sent addition multi-link reconfiguration response frame. The addition reconfiguration multi-link element carried in the addition multi-link reconfiguration response frame includes a common information field and a link information field. The common information field includes an MLD MAC address subfield, an MLD capabilities subfield, an EML capabilities subfield, a link ID information subfield, and a BSS parameters change count subfield. The link information field includes a per-STA profile subelement corresponding to the addition link. For each per-STA profile subelement of the link information field, the complete profile subfield of the STA control field is set to be 1, and when the addition link is accepted to be established, the status code in the STA profile subfield of the corresponding per-STA profile subelement indicates "success". When the addition link is denied to be established, the status code in the STA profile subfield of the corresponding per-STA profile subelement indicates "failure reason". The link ID subfield of the STA control field of the per-STA profile subelement of the AP corresponding to the addition link is set as the link ID of the affiliated AP operating on the link of the AP MLD.

In one example, FIG. 11 illustrates a schematic diagram of an addition multi-link reconfiguration. As illustrated in FIG. 11, the Non-AP MLD has three affiliated STAs, namely Non-AP STA1, Non-AP STA2, and Non-AP STA3. The AP MLD has three affiliated STAs, namely AP1, AP2, and AP3. The multi-link setup has been successfully performed between the Non-AP MLD and the AP MLD, and a link 1 between the non-AP STA1 and AP1 and a link 2 between the STA2 and AP2 have been established. The non-AP STA1 is related with the AP1 and the non-AP STA2 is related with the AP2. However, a link between the non-AP STA3 and the AP3 is not established, i.e., the non-AP STA3 is not related with the AP3. Based on this, the Non-AP MLD initiates the addition multi-link reconfiguration procedure. The Non-AP STA1 sends a multi-link reconfiguration request frame to the AP1 on a successfully established link (such as the link 1). A Transmission Address (TA) field of the multi-link reconfiguration request frame is set as the MAC address of the Non-AP STA1, and a Reception Address (RA) field is set as the MAC address of the AP1. The multi-link reconfiguration request frame contains the addition reconfiguration multi-link element in the above scheme, and the addition reconfiguration multi-link element indicates the MLD MAC address of the non-AP MLD, indicates complete information of the non-AP STA3 in the carried per-STA profile subelement, and requests for setup of an addition link between the non-AP STA3 and the AP3. The AP MLD responds to the requested addition multi-link reconfiguration, and the AP1 sends a multi-link reconfiguration response frame to the Non-AP STA1. The TA field of the multi-link reconfiguration response frame is set as the MAC address of the AP1 and the RA field is set as the MAC address of the Non-AP STA1, and the multi-link reconfiguration response frame indicates that the link (link 3) between the non-AP STA3 and the AP3 is successfully established. The multi-link reconfiguration response frame contains an addition reconfiguration multi-link element in the above scheme, and the addition reconfiguration multi-link element indicates the MLD MAC address of the AP MLD, and indicates complete information of the AP3 in the carried per-STA profile subelement. After the addition multi-link reconfiguration between the Non-AP MLD and AP MLD is successfully completed, an addition link (i.e. the link 3) between non-AP STA3 and AP3 is established. Furthermore, after setup of the link 3 is completed, the link 3 uses the PTK formed by the successful multi-link (the link 1 and the link 2) setup between the non-AP MLD and the AP MLD previously to encrypt and decrypt the unicast frame, the multicast key handshake protocol established for the multicast key of the link 3 is performed through the link 1, and GTK, IGTK, and BIGTK of the link 3 are established.

According to the technical solutions of the embodiments of the present disclosure, to solve the problem that the definition of the multi-link reconfiguration in the specification is limited to the scenario of adding one or more affiliated APs into an AP MLD or deleting one or more affiliated APs from the AP MLD, the method and mechanism for establishing one or more addition links or deleting one or more established links on the basis that the first MLD has been related with the second MLD and multi-link setup is successfully performed are defined.

Preferred embodiments of the present disclosure have been described in detail with reference to the accompanying drawings, but the present disclosure is not limited to the specific details of the above embodiments. Within the scope of the technical conception of the present disclosure, various simple modifications may be made to the technical scheme of the present disclosure, and these simple modifications all fall within the scope of protection of the present disclosure. For example, specific technical features described in the above specific embodiments may be combined in any suitable manner without contradiction, and various possible combinations are not further described in this disclosure in order to avoid unnecessary repetition. For another example, various different implementations of the present disclosure may be combined arbitrarily as long as the combination does not depart from the idea of the present disclosure, and the combination should be regarded as the contents of the present disclosure. For another example, various embodiments and/or the technical features of the various embodiments in the present disclosure may be combined with the related art in any manner without conflict, and the resulting technical solutions shall also fall within the scope of protection of the present disclosure.

It is to be understood that, in various embodiments of the present disclosure, a magnitude of a sequence number of each process does not mean an execution sequence and the execution sequence of each process should be determined by its function and an internal logic and should not form any limit to an implementation process of the embodiments of the present disclosure. Furthermore, in the embodiments of the present disclosure, the terms "downlink", "uplink" and "sidelink" are used to indicate a direction of transmission of signals or data, "downlink" is used to indicate that the signal or data is transmitted in a first direction from a station to user equipment (UE) of a cell, "uplink" is used to indicate that the signal or data is transmitted in a second direction from UE of a cell to a station, and "sidelink" is used to indicate that the signal or data is transmitted in a third direction from UE 1 to UE 2. For example, "downlink signal" indicates that the signal is transmitted in the first direction. Further, in the embodiments of the present disclosure, the term "and/or" is only an association relationship describing associated objects and represents that three relationships may exist. Specifically, A and/or B may represent three conditions: i.e., independent existence of A, existence of both A and B, and independent existence of B. In addition, character "/" in the present disclosure usually represents that previous and next associated objects form an "or" relationship.

FIG. 12 is a schematic diagram of a structural composition of a multi-link reconfiguration device according to an embodiment of the present disclosure, and the multi-link reconfiguration device is applied to the first MLD. As illustrated in FIG. 12, the device includes a communicating unit 1201.

The communicating unit 1201 is configured to send a first multi-link element to a second MLD, and/or receive a second multi-link element sent by the second MLD. The first multi-link element and/or the second multi-link element is used for determining at least one of:

a type of multi-link reconfiguration operation, where one type of multi-link reconfiguration is for indicating link addition or another type of multi-link reconfiguration is for indicating link deletion;
  link information of a first part of links;
  common information of multiple links; or
  link information of a link related with the first part of links in a second part of links,
  where the first part of links is a link requested to be added or a link requested to be deleted by the first MLD, and the second part of links is at least one link established between the first MLD and the second MLD when or before performing the multi-link reconfiguration.

In some implementations, in a case that the first part of links is the link requested to be added by the first MLD, the common information of multiple links is common information of the first part of links and the second part of links; or, in a case that the first part of links is the link requested to be deleted by the first MLD, the common information of multiple links is common information of remaining links in the second part of links after the first part of links is deleted from the second part of links.

In some implementations, the first multi-link element includes at least one of:

a first multi-link control field for indicating the type of the multi-link reconfiguration operation;
  a first common information field for indicating the common information of multiple links; or
  a first link information field for indicating the link information of the first part of links and/or the link information of the link related with the first part of links in the second part of links.

In some implementations, the first multi-link element further includes at least one of:

a first element identification (ID) field for indicating an element ID of the first multi-link element;
  a first length field for indicating a length of the first multi-link element; or a first element ID extension field for indicating an extension element ID of the first multi-link element.

In some implementations, one or more subfields of the first multi-link control field are used for indicating a type and/or subtype of the first multi-link element, and the type and/or subtype of the first multi-link element is used for determining the type of the multi-link reconfiguration operation.

In some implementations, the first multi-link control field includes a first type subfield for indicating the type and/or the subtype of the first multi-link element; or the first multi-link control field includes a first type subfield for indicating the type of the first multi-link element, and a first subtype subfield for indicating the subtype of the first multi-link element; or the first multi-link control field includes a first subtype subfield for indicating the subtype of the first multi-link element.

In some implementations, the type of the first multi-link element is a reconfiguration multi-link element.

In some implementations, the subtype of the first multi-link element is a first type of the reconfiguration multi-link element used for the link addition in the multi-link reconfiguration, or a second type of the reconfiguration multi-link element used for the link deletion in the multi-link reconfiguration.

In some implementations, the first multi-link control field further includes a first presence bitmap, and the first presence bitmap is used for indicating a subfield present in the first common information field of the first multi-link element.

In some implementations, the first presence bitmap subfield includes at least one of:

a first part of bits for indicating whether a first MLD Media Access Control (MAC) address subfield is present in the first common information field;
  a second part of bits for indicating whether a first link ID information subfield is present in the first common information field;
  a third part of bits for indicating whether a first Basic Service Set (BSS) parameters change count subfield is present in the first common information field;
  a fourth part of bits for indicating whether a first Enhanced Multi-Link (EML) capabilities subfield is present in the first common information field; or
  a fifth part of bits for indicating whether a first MLD capabilities subfield is present in the first common information field.

In some implementations, the first common information field includes at least one of:

a first common information length subfield for indicating a length of the first common information field;
  a first MLD MAC address subfield for indicating an MLD MAC address of the first MLD;
  a first link ID information subfield for indicating a link ID corresponding to an affiliated station (STA) sending the first multi-link element or a reconfigured link ID;
  a first BSS parameters change count subfield for counting a number of critical updates to BSS parameters;
  a first EML capabilities subfield for indicating an EML capability of the first MLD; or
  a first MLD capabilities subfield for indicating an MLD capability of the first MLD.

In some implementations, the first MLD capabilities subfield includes at least one of:

a first part of MLD capabilities subfield for indicating a first part of MLD capabilities information affected by the multi-link reconfiguration; or a second part of MLD capabilities subfield for indicating a second part of MLD capabilities information not affected by the multi-link reconfiguration.

In some implementations, in the case that the first part of links is the link requested to be added by the first MLD, the first part of MLD capabilities information indicated by the first part of MLD capabilities subfield is updated based on the requested multi-link reconfiguration according to the first part of links and the second part of links; or, in the case that the first part of links is the link requested to be deleted by the first MLD, the first part of MLD capabilities information indicated by the first part of MLD capabilities subfield is updated based on the requested multi-link reconfiguration according to the remaining links in the second part of links after the first part of links is deleted from the second part of links.

In some implementations, in a case that the first MLD capabilities subfield includes the second part of MLD capabilities subfield, the second part of MLD capabilities information indicated by the second part of MLD capabilities subfield is kept consistent with a second part of MLD capabilities information adopted by the second part of links when or before performing the multi-link reconfiguration; or in a case that the first MLD capabilities subfield does not include the second part of MLD capabilities subfield, the second part of MLD capabilities information is defaulted to be consistent with a second part of MLD capabilities information adopted by the second part of links when or before performing the multi-link reconfiguration.

In some implementations, the first part of MLD capabilities subfield includes at least one of:

a first maximum number of simultaneous links subfield for indicating a maximum number of simultaneous links; or a first frequency separation for Simultaneous Transmitting and Receiving (STR) subfield for indicating a STR frequency spacing between links.

In some implementations, in the case that the first part of links is the link requested to be added by the first MLD, the maximum number of simultaneous links indicated by the first maximum number of simultaneous links subfield is updated based on the requested multi-link reconfiguration according to link conditions of the first part of links and the second part of links; or, in the case that the first part of links is the link requested to be deleted by the first MLD, the maximum number of simultaneous links indicated by the first maximum number of simultaneous links subfield is updated based on the requested multi-link reconfiguration according to link conditions of the remaining links in the second part of links after the first part of links is deleted from the second part of links.

In some implementations, in the case that the first part of links is the link requested to be added by the first MLD, the STR frequency spacing indicated by the first frequency separation for STR subfield is updated based on the requested multi-link reconfiguration according to a STR frequency spacing between the first part of links, a STR frequency spacing between the second part of links, and a STR frequency spacing between the first part of links and the second part of links; or in the case that the first part of links is the link requested to be deleted by the first MLD, the STR frequency spacing indicated by the first frequency separation for STR subfield is updated based on the requested multi-link reconfiguration according to a STR frequency spacing between the remaining links in the second part of links after the first part of links is deleted from the second part of links.

In some implementations, the second part of MLD capabilities subfield includes at least one of:

a first Single Response Scheduling (SRS) support subfield for indicating a capability for supporting a single response scheduling; or a first Traffic ID (TID)-to-link mapping negotiation support subfield for indicating a capability for supporting a TID-to-link mapping negotiation.

In some implementations, the first link information field includes STA information of an affiliated STA in the first MLD that corresponds to each link of the first part of links and/or the link related with the first part of links in the second part of links.

In some implementations, the STA information is carried in a per-STA profile subelement, and the per-STA profile subelement includes at least one of:

a first subelement ID subfield for indicating a subelement ID of the per-STA profile subelement;

a first length subfield for indicating a length of the per-STA profile subelement;

a first STA control subfield for indicating STA control information;

a first STA information subfield for indicating STA information; or a first STA profile subfield for indicating STA profile information.

In some implementations, a first STA information subfield corresponding to the link related with the first part of links in the second part of links includes a first part of STA information subfield for indicating STA information that has been updated.

In some implementations, the first STA information subfield corresponding to the link related with the first part of links in the second part of links further includes a second part of STA information subfield for indicating STA information that has not been updated.

In some implementations, the first part of STA information subfield includes at least one of:

a first NSTR indication bitmap subfield;

a first beacon interval subfield;

a first Timing Synchronization Function (TSF) offset subfield;

a first Delivery Traffic Indication Map (DTIM) information subfield; or, a first BSS parameters change count subfield.

In some implementations, in a case that the first multi-link element is a first type of reconfiguration multi-link element, the first STA control subfield includes at least one of:

a first link ID subfield for indicating a target link;

a first link reconfiguration indication subfield for indicating a type of a reconfiguration operation performed on the target link;

a first complete profile subfield for indicating whether the first STA profile subfield carries complete STA profile information;

a first MAC address present subfield for indicating whether a STA MAC address subfield is present in the first STA information subfield;

a first beacon interval present subfield for indicating whether a beacon interval subfield is present in the first STA information subfield;

a first DTIM information present subfield for indicating whether a DTIM information subfield is present in the first STA information subfield;

a first NSTR link pair present subfield for indicating whether an NSTR link pair subfield is present in the first STA information subfield;

a first NSTR bitmap size subfield for indicating a size of an NSTR bitmap; or a first BSS parameters change count present subfield for indicating whether a BSS parameters change count subfield is present in the first STA information subfield.

The first type of reconfiguration multi-link element is used for the link addition in the multi-link reconfiguration.

In some implementations, in the case that the first multi-link element is the first type of reconfiguration multi-link element, the first STA information subfield includes at least one of:

a first STA information length subfield;

a first STA MAC address subfield;

a first beacon interval subfield;

a first TSF offset subfield;

a first DTIM information subfield;

a first NSTR indication bitmap subfield;

a first BSS parameters change count subfield; or a first TSF subfield.

In some implementations, in a case that the first multi-link element is a second type of reconfiguration multi-link element, the first STA control subfield includes at least one of:

a first link ID subfield for indicating a target link;

a first link reconfiguration indication subfield for indicating a type of a reconfiguration operation performed on the target link;

a first MAC address present subfield for indicating whether a STA MAC address subfield is present in the first STA information subfield; or a first delete timer present subfield for indicating whether a delete timer subfield is present in the first STA information subfield.

The second type of reconfiguration multi-link element is used for the link deletion in the multi-link reconfiguration.

In some implementations, in the case that the first multi-link element is the second type of multi-link element, the first STA information subfield includes at least one of:

a first STA MAC address subfield; or a first delete timer subfield.

In some implementations, the first link reconfiguration indication subfield is set to be a first value for indicating that a link deletion operation is performed on the target link; or the first link reconfiguration indication subfield is set to be a second value for indicating that a link addition operation is performed on the target link; or the first link reconfiguration indication subfield is set to be a third value for indicating that the target link is a link on which the link deletion operation and the link addition operation are not required to be performed, and/or that the target link is a link on which a link adjustment operation is required to be performed, and/or that the target link is the link related with the first part of links in the second part of links.

In some implementations, the first link reconfiguration indication subfield is set to be a first value for indicating that one of a link deletion operation or a link addition operation is performed on the target link; or the first link reconfiguration indication subfield is set to be a second value for indicating that the target link is a link on which the link deletion operation and the link addition operation are not required to be performed, and/or that the target link is a link on which a link adjustment operation is required to be performed, and/or that the target link is the link related with the first part of links in the second part of links.

In some implementations, the communicating unit 1201 is configured to send the first multi-link element to the second MLD through any one of established links in the second part of links; or send the first multi-link element to the second MLD through any one of to-be-established links in the first part of links, where the first part of links is the link requested to be added by the first MLD.

In some implementations, the first multi-link element is carried in a first action field of a first request frame, and the first action field includes a first multi-link element field for indicating the first multi-link element.

In some implementations, the first action field further includes at least one of:

a first category field for indicating a category of the first action field;

a first protected action field for indicating a protected action; or a first dialog token field for indicating a dialog token corresponding to the first request frame.

In some implementations, the second multi-link element includes at least one of:

a second multi-link control field for indicating the type of the multi-link reconfiguration operation;

a second common information field for indicating the common information of multiple links; or a second link information field for indicating the link information of the first part of links and/or the link information of the link related with the first part of links in the second part of links.

In some implementations, the second multi-link element further includes at least one of:

a second element ID field for indicating an element ID of the second multi-link element;

a second length field for indicating a length of the second multi-link element; or a second element ID extension field for indicating an extension element ID of the second multi-link element.

In some implementations, one or more subfields of the second multi-link control field are used for indicating a type and/or a subtype of the second multi-link element, and the type and/or the subtype of the second multi-link element is used for determining the type of the multi-link reconfiguration operation.

In some implementations, the second multi-link control field includes a second type subfield for indicating the type and/or the subtype of the second multi-link element; or the second multi-link control field includes a second type subfield for indicating the type of the second multi-link element, and a second subtype subfield for indicating the subtype of the second multi-link element; or the second multi-link control field includes a second subtype subfield for implementations the subtype of the second multi-link element.

In some embodiments, the type of the second multi-link element is a reconfiguration multi-link element.

In some implementations, the subtype of the second multi-link element is a first type of the reconfiguration multi-link element used for the link addition in the multi-link reconfiguration, or a second type of the reconfiguration multi-link element used for the link deletion in the multi-link reconfiguration.

In some implementations, the second multi-link control field further includes a second presence bitmap subfield, and the second presence bitmap subfield is used for indicating a subfield present in the second common information field of the second multi-link element.

In some implementations, the second presence bitmap subfield includes at least one of:

a sixth part of bits for indicating whether a second MLD MAC address subfield is present in the second common information field;

a seventh part of bits for indicating whether a second link ID information subfield is present in the second common information field;

an eighth part of bits for indicating whether a second BSS parameters change count subfield is present in the second common information field;

a ninth part of bits for indicating whether a second EML capabilities subfield is present in the second common information field; or a tenth part of bits for indicating whether a second MLD capabilities subfield is present in the second common information field.

In some implementations, the second common information field includes at least one of:

a second common information length subfield for indicating a length of the second common information field;

a second MLD MAC address subfield for indicating an MLD MAC address of the second MLD;

a second link ID information subfield for indicating a link ID corresponding to an affiliated STA sending the second multi-link element or a reconfigured link ID;

a second BSS parameters change count subfield for counting a number of critical updates to BSS parameters;

a second EML capabilities subfield for indicating an EML capability of the second MLD; or a second MLD capabilities subfield for indicating an MLD capability of the second MLD.

In some implementations, the second MLD capabilities subfield includes at least one of:

a third part of MLD capabilities subfield for indicating a third part of MLD capabilities information affected by the multi-link reconfiguration; or a fourth part of MLD capabilities subfield for indicating a fourth part of MLD capabilities information not affected by the multi-link reconfiguration.

In some implementations, in the case that the first part of links is the link requested to be added by the first MLD, the third part of MLD capabilities information indicated by the third part of MLD capabilities subfield is updated based on the requested multi-link reconfiguration according to the first part of links and the second part of links; or in the case that the first part of links is the link requested to be deleted by the first MLD, the third part of MLD capabilities information indicated by the third part of MLD capabilities subfield is updated based on the requested multi-link reconfiguration according to the remaining links in the second part of links after the first part of links is deleted from the second part of links.

In some implementations, in a case that the second MLD capabilities subfield includes the fourth part of MLD capabilities subfield, the fourth part of MLD capabilities information indicated by the fourth part of MLD capabilities subfield is kept consistent with a fourth part of MLD capabilities information adopted by the second part of links when or before performing the multi-link reconfiguration; or in a case that the second MLD capabilities subfield does not include the fourth part of MLD capabilities subfield, the fourth part of MLD capabilities information is defaulted to be consistent with a fourth part of MLD capabilities information adopted by the second part of links when or before performing the multi-link reconfiguration.

In some implementations, the third part of MLD capabilities subfield includes at least one of:

a second maximum number of simultaneous links subfield for indicating a maximum number of simultaneous links; or a second frequency separation for STR subfield for indicating a STR frequency spacing between links.

In some implementations, in the case that the first part of links is the link requested to be added by the first MLD, the maximum number of simultaneous links indicated by the second maximum number of simultaneous links subfield is updated based on the requested multi-link reconfiguration according to link conditions of the first part of links and the second part of links, or in the case that the first part of links is the link requested to be deleted by the first MLD, the maximum number of simultaneous links indicated by the second maximum number of simultaneous links subfield is updated based on the requested multi-link reconfiguration according to link conditions of the remaining links in the second part of links after the first part of links is deleted from the second part of links.

In some implementations, in the case that the first part of links is the link requested to be added by the first MLD, the STR frequency spacing indicated by the second frequency separation for STR subfield is updated based on the requested multi-link reconfiguration according to a STR frequency spacing between the first part of links, a STR frequency spacing between the second part of links, and a STR frequency spacing between the first part of links and the second part of links; or in the case that the first part of links is the link requested to be deleted by the first MLD, the STR frequency spacing indicated by the second frequency separation for STR subfield is updated based on the requested multi-link reconfiguration according to a STR frequency spacing between the remaining links in the second part of links after the first part of links is deleted from the second part of links.

In some implementations, the fourth part of MLD capabilities subfield includes at least one of:

a second SRS support subfield for indicating a capability for supporting a single response scheduling; or a second TID-to-link mapping negotiation support subfield for indicating a capability for supporting a TID-to-link mapping negotiation.

In some implementations, the second link information field includes STA information of an affiliated STA in the second MLD that corresponds to each link of the first part of links and/or the link related with the first part of links in the second part of links.

In some implementations, the STA information is carried in a per-STA profile subelement, and the per-STA profile subelement includes at least one of:

a second subelement ID subfield for indicating a subelement ID of the per-STA profile subelement;

a second length subfield for indicating a length of the per-STA profile subelement;

a second STA control subfield for indicating STA control information;

a second STA information subfield for indicating STA information; or a second STA profile subfield for indicating STA profile information.

In some implementations, a second STA information subfield corresponding to the link related with the first part of links in the second part of links includes a third part of STA information subfield for indicating STA information that has been updated.

In some implementations, the second STA information subfield corresponding to the link related with the first part of links in the second part of links further includes a fourth part of STA information subfield for indicating STA information that has not been updated.

In some implementations, the third part of STA information subfield includes at least one of:

a second NSTR bitmap subfield;

a second beacon interval subfield;

a second TSF offset subfield;

a second DTIM information subfield; or a second BSS parameters change count subfield.

In some implementations, in a case that the second multi-link element is a first type of reconfiguration multi-link element, the second STA control subfield includes at least one of:

a second link ID subfield for indicating a target link;

a second link reconfiguration indication subfield for indicating a type of a reconfiguration operation performed on the target link;

a second complete profile subfield for indicating whether the second STA profile subfield carries complete STA profile information;

a second MAC address present subfield for indicating whether a STA MAC address subfield is present in the second STA information subfield;

a second beacon interval present subfield for indicating whether a beacon interval subfield is present in the second STA information subfield;

a second DTIM information present subfield for indicating whether a DTIM information subfield is present in the second STA information subfield;

a second NSTR link pair present subfield for indicating whether an NSTR link pair subfield is present in the second STA information subfield;

a second NSTR bitmap size subfield for indicating a size of an NSTR bitmap; or a second BSS parameters change count present subfield for indicating whether a BSS parameters change count subfield is present in the second STA information subfield.

The first type of reconfiguration multi-link element is used for the link addition in the multi-link reconfiguration.

In some implementations, in the case that the second multi-link element is the first type of reconfiguration multi-link element, the second STA information subfield includes at least one of:

a second STA information length subfield;

a second STA MAC address subfield;

a second beacon interval subfield;

a second TSF offset subfield;

a second DTIM information subfield;

a second NSTR indication bitmap subfield;

a second BSS parameters change count subfield; or a second TSF subfield.

In some implementations, in a case that the second multi-link element is a second type of reconfiguration multi-link element, the second STA control subfield includes at least one of:

a second link ID subfield for indicating a target link;

a second link reconfiguration indication subfield for indicating a type of a reconfiguration operation performed on the target link;

a second MAC address present subfield for indicating whether a STA MAC address subfield is present in the second STA information subfield; or a second delete timer present subfield for indicating whether a delete timer subfield is present in the second STA information subfield.

The second type of reconfiguration multi-link element is used for the link deletion in the multi-link reconfiguration.

In some implementations, in the case that the second multi-link element is the second type of multi-link element, the second STA information subfield includes at least one of:

a second STA MAC address subfield; or a second delete timer subfield.

In some implementations, the second link reconfiguration indication subfield is set to be a first value for indicating that a link deletion operation is performed on the target link; or the second link reconfiguration indication subfield is set to be a second value for indicating that a link addition operation is performed on the target link; or the second link reconfiguration indication subfield is set to be a third value for indicating that the target link is a link on which the link deletion operation and the link addition operation are not required to be performed, and/or that the target link is a link on which a link adjustment operation is required to be performed, and/or that the target link is the link related with the first part of links in the second part of links.

In some implementations, the second link reconfiguration indication subfield is set to be a first value for indicating that one of a link deletion operation or a link addition operation is performed on the target link; or the second link reconfiguration indication subfield is set to be a second value for indicating that the target link is a link on which the link deletion operation and the link addition operation are not required to be performed, and/or that the target link is a link on which a link adjustment operation is required to be performed, and/or that the target link is the link related with the first part of links in the second part of links.

In some implementations, a status code in a second STA profile subfield of the per-STA profile subelement corresponding to an addition link accepted by the second MLD indicates success of link addition; and a status code in a second STA profile subfield of the per-STA profile subelement corresponding to an addition link denied by the second MLD indicates failure of link addition.

In some implementations, the communicating unit 1201 is configured to receive the second multi-link element sent by the second MLD on a link on which the first multi-link element is sent.

In some implementations, the second multi-link element is carried in a second action field of a first response frame, and the second action field includes a second multi-link element field for indicating the second multi-link element.

In some implementations, the second action field further includes at least one of:

a second category field for indicating a category of the second action field;

a second protected action field for indicating a protected action; or a second dialog token field for indicating a dialog token corresponding to the first response frame;

a status code field for indicating whether the requested multi-link reconfiguration is accepted.

In some implementations, the status code field is set to be a first value for indicating that the second MLD accepts setup requests for all addition links; the status code field is set to be a second value for indicating that the second MLD denies setup requests for all addition links; or the status code field is set to be a third value for indicating that the second MLD accepts setup requests for a part of addition links and/or denies setup requests for a part of addition links.

In some implementations, in the case that the first part of links is the link requested to be added by the first MLD, after the first part of links is added, a first part of parameters used by the first part of links and the second part of links is unchanged; and/or a second part of parameters used by the first part of links is re-established.

In some implementations, the first part of parameters includes at least one of a PTK, or an AID.

In some implementations, the second part of parameters includes at least one of: a GTK, an IGTK, or a BIGTK.

In some implementations, the communicating unit 1201 is configured to perform interaction of a handshake message with the second MLD. The interaction of the handshake message is used for establishing the second part of parameters for the first part of links.

In some implementations, the first MLD is a non-AP MLD and the second MLD is an AP MLD.

Those skilled in the art will appreciate that the above relevant description of the multi-link reconfiguration device in the embodiment of the present disclosure may be understood with reference to the relevant description of the multi-link reconfiguration method in the embodiments of the present disclosure.

Figure 13:
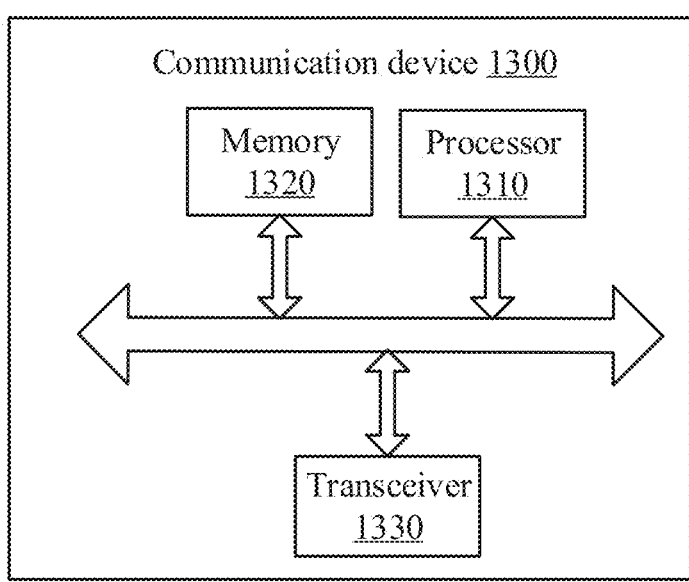
FIG. 13 is a schematic structural diagram of a communication device according to an embodiment of the present disclosure.

FIG. 13 is a schematic structural diagram of a communication device 1300 according to an embodiment of the present disclosure. The communication device may be the first MLD or the second MLD. The communication device 1300 illustrated in FIG. 13 includes a processor 1310, and the processor 1310 may invoke and execute a computer program from a memory to implement the method in the embodiments of the present disclosure.

In an embodiment, as illustrated in FIG. 13, the communication device 1300 may further include a memory 1320. The processor 1310 may invoke and execute a computer program from the memory 1320 to implement the method in the embodiments of the present disclosure.

The memory 1320 may be a separate device independent of the processor 1310 or the memory 1320 may be integrated into the processor 1310.

In an embodiment, as illustrated in FIG. 13, the communication device 1300 may further include a transceiver 1330. The processor 1310 may control the transceiver 1330 to communicate with other devices, in particular, to send information or data to other devices, or receive information or data sent by other devices.

The transceiver 1330 may include a transmitter and a receiver. The transceiver 1530 may further include an antenna(s), the number of which may be one or more.

In an embodiment, the communication device 1300 may specifically be the first MLD in the embodiments of the present disclosure, and the communication device 1300 may implement the corresponding process implemented by the first MLD in each method of the embodiments of the present disclosure, which will not be repeated herein for the sake of brevity.

In an embodiment, the communication device 1300 may specifically be the second MLD in the embodiments of the present disclosure, and the communication device 1300 may implement the corresponding process implemented by the second MLD in each method of the embodiments of the present disclosure, which will not be repeated herein for the sake of brevity.

Figure 14:
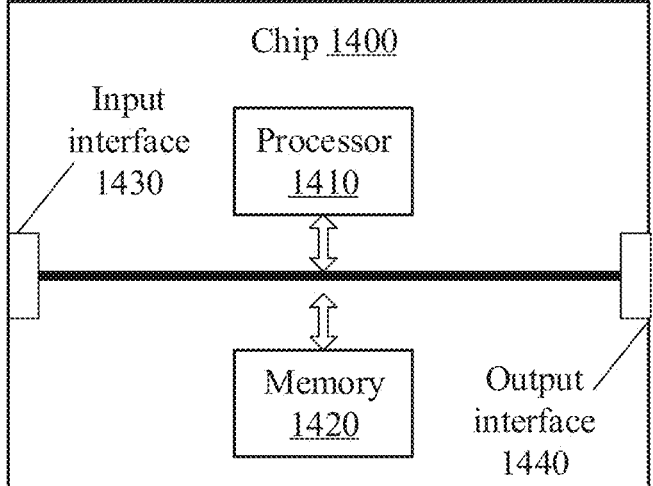
FIG. 14 is a schematic structural diagram of a chip according to an embodiment of the present disclosure.

FIG. 14 is a schematic structural diagram of a chip according to an embodiment of the present disclosure. The chip 1400 illustrated in FIG. 14 includes a processor 1410, and the processor 1410 may invoke and execute a computer program from a memory to implement the method in the embodiments of the present disclosure.

In an embodiment, as illustrated in FIG. 14, the chip 1400 may further include a memory 1420. The processor 1410 may invoke and execute a computer program from the memory 1420 to implement the method in the embodiments of the present disclosure.

The memory 1420 may be a separate device independent of the processor 1410 or the memory 1420 may be integrated into the processor 1410.

In an embodiment, the chip 1400 may further include an input interface 1430. The processor 1410 may control the input interface 1430 to communicate with other devices or chips, and in particular may obtain information or data sent by other devices or chips.

In an embodiment, the chip 1400 may further include an output interface 1440. The processor 1410 may control the output interface 1440 to communicate with other devices or chips, and in particular may output information or data to other devices or chips.

In an embodiment, the chip may be applied to the first MLD in the embodiments of the present disclosure, and the chip may implement the corresponding process implemented by the first MLD in each method of the embodiments of the present disclosure, which is not repeated herein for the sake of brevity.

In an embodiment, the chip may be applied to the second MLD in the embodiments of the present disclosure, and the chip may implement the corresponding process implemented by the second MLD in each method of the embodiments of the present disclosure, which is not repeated herein for the sake of brevity.

It is to be understood that the chip mentioned in the embodiments of the present disclosure may also be referred to as a system-level chip, a system chip, a chip system, or a System on Chip (SOC) chip, etc.

Figure 15:
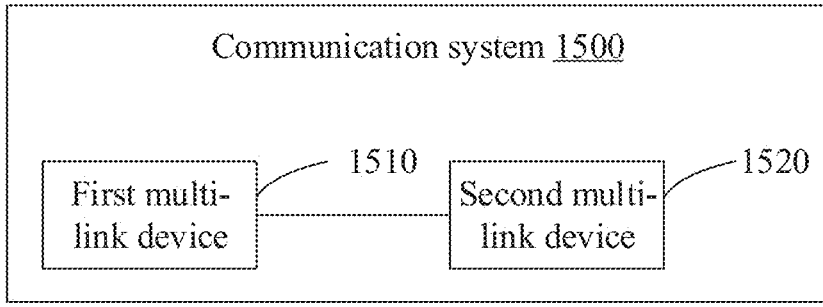
FIG. 15 is a schematic block diagram of a communication system according to an embodiment of the present disclosure.

FIG. 15 is a schematic block diagram of a communication system 1500 according to an embodiment of the present disclosure. As illustrated in FIG. 15, the communication system 1500 includes a first MLD 1510 and a second MLD 1520.

The first MLD 1510 may be used for implementing the corresponding functions implemented by the first MLD in the above-described method, and the second MLD 1520 may be used for implementing the corresponding functions implemented by the second MLD in the above-described method, which is not repeated herein for the sake of brevity.

It should be understood that the processor in the embodiments of the present disclosure may be an integrated circuit chip with signal processing capability. During implementation, each operation of the above method embodiments may be completed by an integrated logic circuit of hardware in the processor or an instruction in form of software. The processor may be a general-purpose processor, a Digital Signal Processor (DSP), an Application Specific Integrated Circuit (ASIC), a Field Programmable Gate Array (FPGA), or another programmable logical device, discrete gate or transistor logical device and discrete hardware component. Each method, operation and logical block diagram disclosed in the embodiments of the present disclosure may be implemented or executed. The general-purpose processor may be a microprocessor or the processor may also be any conventional processor and the like. The operations of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or an electrically erasable programmable memory, and a register. The storage medium is located in a memory, and the processor reads information in the memory, and completes operations of the above methods in combination with hardware thereof.

It is to be understood that the memory in the embodiments of the present disclosure may be a volatile memory or a non-volatile memory, or may include both volatile and non-volatile memories. The non-volatile memory may be a ROM, a PROM, an Erasable PROM (EPROM), an Electrically EPROM (EEPROM), or a flash memory. The volatile memory may be a Random Access Memory (RAM) used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM) and a Direct Rambus RAM (DR RAM). It is to be noted that the memory of the system and method described in the present disclosure is intended to include, but not limited to, memories of these and any other proper types.

It is to be understood that the above memory is exemplarily but unlimitedly described. For example, the memory in the embodiments of the present disclosure may also be an SRAM, a DRAM, an SDRAM, a DDR SDRAM, an ESDRAM, an SLDRAM and a DR RAM. That is, the memory in the embodiments of the present disclosure is intended to include but not limited to memories of these and any other proper types.

The embodiments of the present disclosure further provide a computer-readable storage medium, which is configured to store a computer program.

In an embodiment, the computer-readable storage medium may be applied to the first MLD in the embodiments of the present disclosure. The computer program enables a computer to execute corresponding flows implemented by the first MLD in each method of the embodiments of the present disclosure, which is not repeated herein for the sake of brevity.

In an embodiment, the computer-readable storage medium may be applied to the second MLD in the embodiments of the present disclosure. The computer program enables a computer to execute corresponding flows implemented by the second MLD in each method of the embodiments of the present disclosure, which is not repeated herein for the sake of brevity.

The embodiments of the present disclosure further provide a computer program product, which includes computer program instructions.

In an embodiment, the computer program product may be applied to the first MLD in the embodiments of the present disclosure. The computer program instructions enable a computer to execute corresponding flows implemented by the first MLD in each method of the embodiments of the present disclosure, which is not repeated herein for the sake of brevity.

In an embodiment, the computer program product may be applied to the second MLD in the embodiments of the present disclosure. The computer program instructions enable a computer to execute corresponding flows implemented by the second MLD in each method of the embodiments of the present disclosure, which is not repeated herein for the sake of brevity.

The embodiments of the present disclosure further provide a computer program.

In an embodiment, the computer program may be applied to the first MLD in the embodiments of the present disclosure. The computer program, when run on a computer, enables the computer to execute corresponding flows implemented by the first MLD in each method of the embodiments of the present disclosure, which is not repeated herein for the sake of brevity.

In an embodiment, the computer program may be applied to the second MLD in the embodiments of the present disclosure. The computer program, when run on a computer, enables the computer to execute corresponding flows implemented by the second MLD in each method of the embodiments of the present disclosure, which is not repeated herein for the sake of brevity.

Those of ordinary skill in the art may realize that the units and algorithm operations of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, apparatus and unit described above may refer to the corresponding processes in the method embodiments and will not be elaborated herein for convenient and brief description.

In some embodiments provided by the present disclosure, it is to be understood that the disclosed system, apparatus and method may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a first processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the present disclosure. The abovementioned storage medium includes: various media capable of storing program codes such as a U disk, a mobile hard disk, a ROM, a RAM, a magnetic disk or an optical disk.

The above is only the specific implementation of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. A multi-link reconfiguration method, comprising:
sending, by a first Multi-Link Device (MLD), a first multi-link element to a second MLD, wherein the first multi-link element is used for determining at least one of:
a type of multi-link reconfiguration operation, wherein the type of multi-link reconfiguration operation comprises link addition and link deletion; or
link information of a first part of links, the links being between the first MLD and a second MLD;
wherein the first part of links is a link requested to be added or a link requested to be deleted by the first MLD,
wherein the first multi-link element comprises a first common information field for indicating the common information of the links and/or a first link information field for indicating the link information of the first part of links, and the first common information field comprises a first MLD capabilities subfield for indicating an MLD capability of the first MLD,
wherein the first MLD capabilities subfield comprises at least one of:
a first part of MLD capabilities subfield for indicating a first part of MLD capabilities information affected by the multi-link reconfiguration; or
a second part of MLD capabilities subfield for indicating a second part of MLD capabilities information not affected by the multi-link reconfiguration.

2. The method of claim 1, wherein
in a case that the first part of links is the link requested to be added by the first MLD, the common information of the links is common information of the first part of links.

3. The method of claim 1, wherein the first multi-link element further comprises at least one of:
a first element identification (ID) field for indicating an element ID of the first multi-link element;
a first length field for indicating a length of the first multi-link element; or
a first element ID extension field for indicating an extension element ID of the first multi-link element.

4. The method of claim 1, wherein the first multi-link element further comprises a first multi-link control field for indicating the type of the multi-link reconfiguration operation, one or more subfields of the first multi-link control field are used for indicating a type and/or a subtype of the first multi-link element, and the type and/or the subtype of the first multi-link element is used for determining the type of the multi-link reconfiguration operation;

wherein
the first multi-link control field comprises a first type subfield for indicating the type and/or the subtype of the first multi-link element; or
the first multi-link control field comprises a first type subfield for indicating the type of the first multi-link element, and a first subtype subfield for indicating the subtype of the first multi-link element; or
the first multi-link control field comprises a first subtype subfield for indicating the subtype of the first multi-link element;
wherein the type of the first multi-link element is a reconfiguration multi-link element.

5. The method of claim 4, wherein the first multi-link control field further comprises a first presence bitmap subfield, and the first presence bitmap subfield is used for indicating a subfield present in the first common information field of the first multi-link element;
wherein the first presence bitmap subfield comprises at least one of:
a first part of bits for indicating whether a first MLD Media Access Control (MAC) address subfield is present in the first common information field;
a second part of bits for indicating whether a first link ID information subfield is present in the first common information field;
a third part of bits for indicating whether a first Basic Service Set (BSS) parameters change count subfield is present in the first common information field;
a fourth part of bits for indicating whether a first Enhanced Multi-Link (EML) capabilities subfield is present in the first common information field; or
a fifth part of bits for indicating whether a first MLD capabilities subfield is present in the first common information field.

6. The method of claim 1, wherein the first common information field further comprises at least one of:
a first common information length subfield for indicating a length of the first common information field;
a first MLD MAC address subfield for indicating an MLD MAC address of the first MLD;
a first link ID information subfield for indicating a link ID corresponding to an affiliated station (STA) sending the first multi-link element or a reconfigured link ID;
a first BSS parameters change count subfield for counting a number of critical updates to BSS parameters; or
a first EML capabilities subfield for indicating an EML capability of the first MLD.

7. The method of claim 1, wherein
in the case that the first part of links is the link requested to be added by the first MLD, the first part of MLD capabilities information indicated by the first part of MLD capabilities subfield is updated based on the requested multi-link reconfiguration according to the first part of links and a second part of links, the second part of links being at least one link established between the first MLD and the second MLD when or before performing the multi-link reconfiguration; or
in the case that the first part of links is the link requested to be deleted by the first MLD, the first part of MLD capabilities information indicated by the first part of MLD capabilities subfield is updated based on the requested multi-link reconfiguration according to the remaining links in the second part of links after the first part of links is deleted from the second part of links.

8. The method of claim 1, wherein
in a case that the first MLD capabilities subfield comprises the second part of MLD capabilities subfield, the second part of MLD capabilities information indicated by the second part of MLD capabilities subfield is kept consistent with a second part of MLD capabilities information adopted by a second part of links when or before performing the multi-link reconfiguration, the second part of links being at least one link established between the first MLD and the second MLD when or before performing the multi-link reconfiguration; or in a case that the first MLD capabilities subfield does not comprise the second part of MLD capabilities subfield, the second part of MLD capabilities information is defaulted to be consistent with a second part of MLD capabilities information adopted by the second part of links when or before performing the multi-link reconfiguration.

9. The method of claim 1, wherein the first part of MLD capabilities subfield comprises at least one of:

a first maximum number of simultaneous links subfield for indicating a maximum number of simultaneous links; or a first frequency separation for Simultaneous Transmitting and Receiving (STR) subfield for indicating a STR frequency spacing between links;

wherein in the case that the first part of links is the link requested to be added by the first MLD, the maximum number of simultaneous links indicated by the first maximum number of simultaneous links subfield is updated based on the requested multi-link reconfiguration according to link conditions of the first part of links and a second part of links, the second part of links being at least one link established between the first MLD and the second MLD when or before performing the multi-link reconfiguration; or in the case that the first part of links is the link requested to be deleted by the first MLD, the maximum number of simultaneous links indicated by the first maximum number of simultaneous links subfield is updated based on the requested multi-link reconfiguration according to link conditions of the remaining links in the second part of links after the first part of links is deleted from the second part of links;

wherein in the case that the first part of links is the link requested to be added by the first MLD, the STR frequency spacing indicated by the first frequency separation for STR subfield is updated based on the requested multi-link reconfiguration according to a STR frequency spacing between the first part of links, a STR frequency spacing between the second part of links, and a STR frequency spacing between the first part of links and the second part of links; or in the case that the first part of links is the link requested to be deleted by the first MLD, the STR frequency spacing indicated by the first frequency separation for STR subfield is updated based on the requested multi-link reconfiguration according to a STR frequency spacing between the remaining links in the second part of links after the first part of links is deleted from the second part of links.

10. The method of claim 1, wherein the second part of MLD capabilities subfield comprises at least one of:

a first Single Response Scheduling (SRS) support subfield for indicating a capability for supporting a single response scheduling; or a first Traffic ID (TID)-to-link mapping negotiation support subfield for indicating a capability for supporting a TID-to-link mapping negotiation.

11. The method of claim 1, wherein the first link information field comprises STA information of an affiliated STA in the first MLD, the affiliated STA corresponding to each link of the first part of links and/or the link related with the first part of links.

12. The method of claim 11, wherein the STA information is carried in a per-STA profile subelement, and the per-STA profile subelement comprises at least one of:

a first subelement ID subfield for indicating a subelement ID of the per-STA profile subelement;

a first length subfield for indicating a length of the per-STA profile subelement;

a first STA control subfield for indicating STA control information;

a first STA information subfield for indicating STA information; or a first STA profile subfield for indicating STA profile information.

13. The method of claim 12, wherein in a case that the first multi-link element is a first type of reconfiguration multi-link element, the first STA control subfield comprises at least one of:

a first link ID subfield for indicating a target link;

a first link reconfiguration indication subfield for indicating a type of a reconfiguration operation performed on the target link;

a first complete profile subfield for indicating whether the first STA profile subfield carries complete STA profile information;

a first MAC address present subfield for indicating whether a STA MAC address subfield is present in the first STA information subfield;

a first beacon interval present subfield for indicating whether a beacon interval subfield is present in the first STA information subfield;

a first DTIM information present subfield for indicating whether a DTIM information subfield is present in the first STA information subfield;

a first NSTR link pair present subfield for indicating whether an NSTR link pair subfield is present in the first STA information subfield;

a first NSTR bitmap size subfield for indicating a size of an NSTR bitmap; or a first BSS parameters change count present subfield for indicating whether a BSS parameters change count subfield is present in the first STA information subfield, wherein the first type of reconfiguration multi-link element is used for the link addition in the multi-link reconfiguration.

14. The method of claim 13, wherein the first link reconfiguration indication subfield is set to be a first value for indicating that a link deletion operation is performed on the target link; or the first link reconfiguration indication subfield is set to be a second value for indicating that a link addition operation is performed on the target link; or the first link reconfiguration indication subfield is set to be a third value for indicating that the target link is a link on which the link deletion operation and the link addition operation are not required to be performed, and/or that the target link is a link on which a link adjustment operation is required to be performed, and/or that the target link is the link related with the first part of links.

15. The method of claim 12, wherein in the case that the first multi-link element is the first type of reconfiguration multi-link element, the first STA information subfield comprises at least one of:

a first STA information length subfield;

a first STA MAC address subfield;

a first beacon interval subfield;

a first TSF offset subfield;

a first DTIM information subfield;

a first NSTR indication bitmap subfield;

a first BSS parameters change count subfield; or a first TSF subfield.

16. The method of claim 12, wherein in a case that the first multi-link element is a second type of reconfiguration multi-link element, the first STA control subfield comprises at least one of:

a first link ID subfield for indicating a target link;

a first link reconfiguration indication subfield for indicating a type of a reconfiguration operation performed on the target link;

a first MAC address present subfield for indicating whether a STA MAC address subfield is present in the first STA information subfield; or a first delete timer present subfield for indicating whether a delete timer subfield is present in the first STA information subfield, wherein the second type of reconfiguration multi-link element is used for the link deletion in the multi-link reconfiguration.

17. The method of claim 1, wherein sending, by the first MLD, the first multi-link element to the second MLD comprises:

sending, by the first MLD, the first multi-link element to the second MLD through any one of established links in a second part of links, the second part of links being at least one link established between the first MLD and the second MLD when or before performing the multi-link reconfiguration; or sending, by the first MLD, the first multi-link element to the second MLD through any one of to-be-established links in the first part of links, wherein the first part of links is the link requested to be added by the first MLD.

18. A communication device, comprising: a processor and a memory, wherein the memory is configured to store a computer program, and the processor is configured to invoke and execute the computer program stored in the memory to perform a multi-link reconfiguration method, comprising:

sending a first multi-link element to a second MLD, wherein the first multi-link element and/or the second multi-link element is used for determining at least one of:

a type of multi-link reconfiguration operation, wherein the type of multi-link reconfiguration operation comprises link addition and link deletion; or link information of a first part of links, the links being between the first MLD and a second MLD;

wherein the first part of links is a link requested to be added or a link requested to be deleted by the first MLD, wherein the first multi-link element comprises a first common information field for indicating the common information of the links and/or a first link information field for indicating the link information of the first part of links, and the first common information field comprises a first MLD capabilities subfield for indicating an MLD capability of the first MLD, wherein the first MLD capabilities subfield comprises at least one of:

a first part of MLD capabilities subfield for indicating a first part of MLD capabilities information affected by the multi-link reconfiguration; or a second part of MLD capabilities subfield for indicating a second part of MLD capabilities information not affected by the multi-link reconfiguration.

* * * * *